(12) United States Patent
Washizu et al.

(10) Patent No.: US 6,686,105 B2
(45) Date of Patent: Feb. 3, 2004

(54) COLOR FILTER, COLOR FILTER FORMING MATERIAL AND PROCESS FOR PRODUCING COLOR FILTER

(75) Inventors: Shintaro Washizu, Shizuoka-ken (JP); Hirotaka Matsumoto, Shizuoka-ken (JP); Kozo Nagata, Shizuoka-ken (JP); Kyoko Hanasaki, Shizuoka-ken (JP)

(73) Assignee: Fuji Photo Film Co., Ltd., Kanagawa (JP)

( * ) Notice: Subject to any disclaimer, the term of this patent is extended or adjusted under 35 U.S.C. 154(b) by 36 days.

(21) Appl. No.: 10/045,100

(22) Filed: Jan. 15, 2002

(65) Prior Publication Data

US 2002/0102480 A1 Aug. 1, 2002

(30) Foreign Application Priority Data

Jan. 18, 2001 (JP) ........................ 2001-010754
May 15, 2001 (JP) ........................ 2001-145401

(51) Int. Cl.⁷ ............................ G03F 7/004; G02B 5/20; G02F 1/1335
(52) U.S. Cl. .......................... 430/7; 430/138; 430/351
(58) Field of Search ............................ 430/7, 138, 351, 430/357, 363, 374, 945; 503/227

(56) References Cited

U.S. PATENT DOCUMENTS 5,462,822 A * 10/1995 Roosen et al. .................. 430/7
5,817,440 A * 10/1998 Hirai et al. ..................... 430/7

* cited by examiner

*Primary Examiner*—John A. McPherson
(74) *Attorney, Agent, or Firm*—Sughrue Mion, PLLC

(57) ABSTRACT

A color filter having a light-transmissive support and two or more color-developing layers, which develop hues differing from each other, laminated on the support. Each color-developing layer is developed into a predetermined color pattern including pixels. The pixels of the developed color patterns of the layers either overlap in a direction of lamination or do not overlap in the direction of lamination. Also provided are a color filter forming material produced by laminating the two or more photosensitive and heat-sensitive color-developing layers on the light-transmissive support, and a process for producing a color filter by exposing each photosensitive and heat-sensitive color-developing layer of the above color filter forming material to form a predetermined pattern, heating the photosensitive and heat-sensitive color-developing layers, and fixing the developed color patterns.

27 Claims, 1 Drawing Sheet

COLOR FILTER, COLOR FILTER FORMING MATERIAL AND PROCESS FOR PRODUCING COLOR FILTER

BACKGROUND OF THE INVENTION

1. Field of the Invention

The present invention relates to a color filter used for a color display such as a liquid crystal display or the like, a color filter forming material and a process for producing the color filter.

2. Description of Related Art

The range of applications of color filters is growing more and more in the field of electrics such as portable information terminals, personal computers, word processors, amusement devices and television devices, as well as display panels used for various electronic devices and electrical devices.

For instance, color filters used for color liquid crystal displays generally have a structure in which pixels of each of red (R), green (G) and blue (B) are formed, and a black matrix is formed in gaps between the pixels with the intention of improving display contrast.

Among color filters like this, those produced by making use of a pigment dispersion method or a dyeing method have been in the majority until now. In the pigment dispersion method, a photoresist in which a pigment is dispersed is applied to a substrate glass, and pattern exposure and a developing step are carried out. This method is superior in pattern edge, resolution and film uniformity. However, this method has a problem that a photoresist step is required, and since a pigment is used, color regulation cannot be accomplished so simply as in the case of using a dye. In addition, this method has the drawback that material loss is increased when a photoresist is applied to a substrate using a spin coating method, and thus coating nonuniformity is large in a case of applying the photoresist to a substrate having a large area. The dyeing method is a method in which a pattern of a transparent resin comprising gelatin or the like provided with light sensitivity is subsequently dyed. This method is characterized by high light transmittance due to transparency of the dye and by easy adjustment of chromaticity due to an abundance of types of dye, but has the drawbacks, for example, that the number of steps, such as a photoresist step, is larger than in the pigment dispersion method.

Further, a printing method, an electrodeposition method and an ink jet method are known as methods of producing a color filter. The printing method is a method in which each color is printed one by one. Thus, it is difficult to align each color pattern, and this method therefore has the drawbacks that the resolution of a pixel is low and film thickness is nonuniform. Therefore, this method involves difficulty when dealing with the formation of a highly accurate image pattern, but it has a high utility factor. The electrodeposition method makes it possible to obtain a color filter which has a relatively high resolution and less nonuniformity of a color layer, but this method has difficult points in that the production steps are complicated and solution control is difficult. The ink jet method has problems concerning resolution and color mixing among pixels adjacent to each other.

Also, in a method of production of a color filter according to the above methods, measures are taken in which a separate color pattern is formed of each color and these plural color patterns are overlapped on each other with these patterns being aligned to each other. In this method, accurate alignment is required. Also, pixels may overlap each other and parts where light is leaked may occur. When pixels are overlapped on each other, the resulting color filter film is made nonuniform and irregularities (projections) are formed on the surface of the film, giving rise to problems such as color mixing, color misregistration, nonuniformity, light leakage and scattering. These problems are particularly significant when manufacturing a black matrix.

Moreover, in recent years, attempts have been made to use a plastic substrate in place of glass as the substrate of a color filter, to satisfy demands for preventing breakage of the substrate and for developing a lighter and thinner type of liquid crystal display. However, in the case of using a plastic substrate, it is difficult to keep a perfectly flat surface, which poses a problem that it is difficult to sequentially incorporate structural components on the substrate compactly.

Hence, conventional methods for producing a color filter as described above have complicated production processes, require large investments in plant and equipment and give rise to problems of waste materials and waste liquid, which make burdens of cost and time heavy. Further, it is expected that demand for reflection-type and semitransparent-type liquid crystal displays such as plastic cells will grow in the future. As a method of producing high quality color filters which can be used in such applications, it is desired to develop a method for production of a color filter having high productivity in terms of low material loss, simplicity and the like, and having low cost and environmental load.

However, a method of producing a color filter which satisfies all of these requirements has not been achieved so far.

SUMMARY OF THE INVENTION

It is an object of the present invention to provide a color filter having high resolution and flatness, a color filter forming material which can form such a color filter and a process for producing a color filter, the process enabling production of the color filter by using a method which has high productivity and is decreased in cost and environmental load.

This object of the present invention can be attained by providing the following color filter, color filter forming material and process for producing a color filter.

The present invention provides a color filter including a light-transmissive support and at least two color-developing layers that develop hues different from each other, the color-developing layers having been laminated on the support and each color-developing layer having been developed in a predetermined color pattern, and respective developed color patterns of the layers including a region at which the color patterns overlap in a direction of lamination, which region has a hue expressed by subtractive color mixing of the colors of the layers that are developed at the region.

Also, the present invention provides a color filter including a light transmissive support and two or more color-developing layers developing hues differing from each other, the color-developing layers being laminated on the support and each color-developing layer being developed into a specific color pattern, wherein the developed color pattern of each layer is not overlapped in the direction of lamination.

These color filters are each constituted of a continuous layer and therefore have excellent characteristics that they have a surface free from irregularities or projections and exhibiting high flatness, and also there is no deficient portion to cause light leakage in the color-developing layer. Also, the latter color filter has an excellent characteristic that high color purity is obtained irrespective of a direction of view, which is not found in conventional color filters.

Further, the present invention provides a color filter forming material including a light-transmissive support and at least two photosensitive and heat-sensitive color-developing layers capable of developing hues different from each other, the color-developing layers being laminated on the support.

In addition, the present invention provides a process for producing a color filter from the color filter forming material that includes at least two photosensitive and heat-sensitive color-developing layers, which are capable of developing hues different from each other, laminated on a light-transmissive support, the process including the steps of: forming latent images by exposing each of the photosensitive and heat-sensitive color-developing layers, such that at least two latent image-formed regions overlap each other in a direction of lamination; developing color by heating the photosensitive and heat-sensitive color-developing layers; and fixing color-developed patterns formed by the step of developing color.

Moreover, the present invention provides producing a color filter from the color filter forming material that includes at least two photosensitive and heat-sensitive color-developing layers, which are capable of developing hues different from each other, laminated on a light-transmissive support, the process including the steps of: forming latent images by exposing each of the photosensitive and heat-sensitive color-developing layers, such that latent image forming regions of the respective layers substantially do not overlap each other in a direction of lamination; developing color by heating the photosensitive and heat-sensitive color-developing layers; and fixing color-developed patterns formed by the step of developing color.

The process for producing a color filter according to the present invention ensures that a color filter having such excellent characteristics as mentioned above can be produced simply by performing only the steps of exposing, heating and fixing the color filter forming material and so a photolithographic step which is conventionally required is unneeded, improving productivity, whereby the production cost of the color filter can be significantly decreased. Also, because all the steps are carried out in a dry condition, environmental load can be decreased.

DETAILED DESCRIPTION OF THE PREFERRED EMBODIMENT

A color filter, a color filter forming material and a process for producing a color filter according to the present invention will be hereinafter explained in detail.

I Color Filter

One of the color filters of the present invention is a color filter including a light transmissive support and two or more color-developing layers that develop hues differing from each other. The color-developing layers are laminated on the support and each color-developing layer is developed into a specific color pattern. The developed color pattern of each layer has a region overlapped in the direction of lamination, this region having a hue developed by subtractive color mixture of the colors of the layers constituting the overlapped portion (hereinafter, this is sometimes called color filter type (A)). Another color filter of the present invention is a color filter including a light transmissive support and two or more color-developing layers that develop hues differing from each other, the color-developing layers being laminated on the support and each color-developing layer being developed into a specific color pattern, in which the developed color pattern of each layer is not overlapped in the direction of lamination (hereinafter, this is sometimes called color filter type (B)).

These color filters type (A) and (B) of the present invention are constituted of continuous layers and therefore have excellent characteristics in that there are no irregularities or projections on their surfaces, which exhibit high flatness, and also there is no deficient portion to cause light leakage in the color-developing layers. Also, the color filter type (B) has an excellent characteristic that high color purity is obtained irrespective of a direction of viewing, which is not found in conventional color filters.

Figure 1:
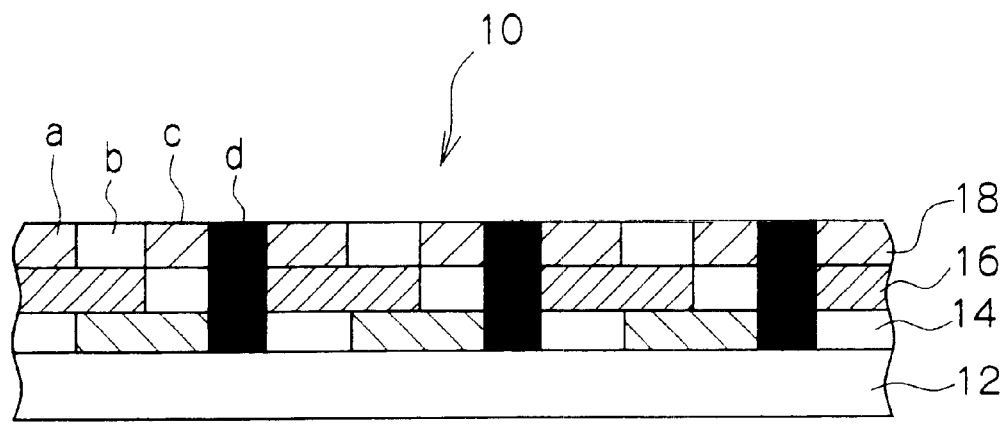
FIG. 1 is a typical sectional view showing one example of a color filter according to the present invention.

FIG. 1 is a typical sectional view showing one example of the color filter type (A) of the present invention. In FIG. 1, 10 represents the color filter, 12 represents a support and 14, 16 and 18 each represents a color-developing layer which develops a color different from that of each other color-developing layer. The region shown by "a" is a region where the color-developing regions of the color-developing layers 16 and 18 are overlapped on each other as viewed along a direction of lamination, the region shown by "b" is a region where the color-developing layers 14 and 16 are overlapped on each other and develop a color, and the region shown by "c" is a region where the color-developing layers 14 and 18 are overlapped on each other and develop a color. Further, the region shown by "d" is a region where all color-developing layers are overlapped on each other to develop a color as viewed from the direction of lamination. Color development in the color filter of the present invention brings about a subtractive color mixture of the overlapped developed colors. For example, the hue of region a becomes a color obtained by the subtractive color mixture of the developed colors of the color-developing layers 16 and 18.

Figure 2:
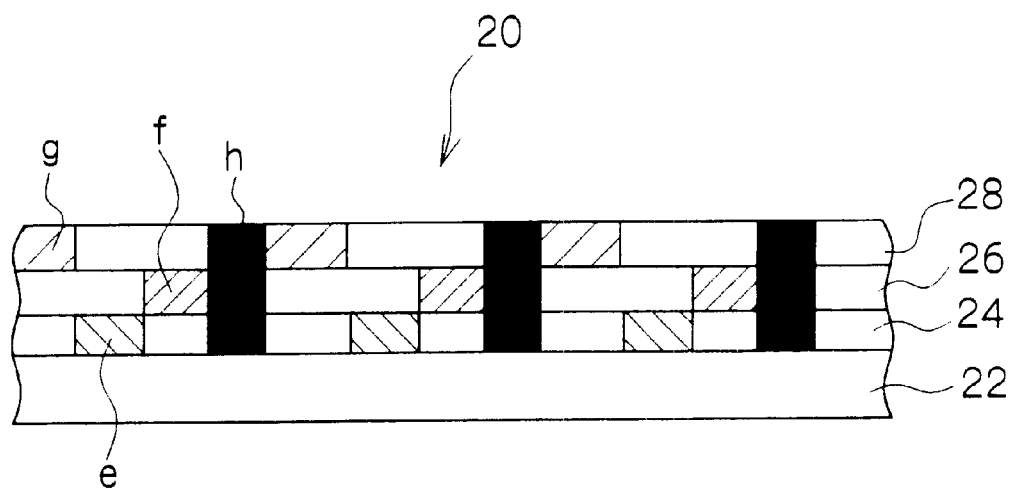
FIG. 2 is a typical sectional view showing another example of a color filter according to the present invention.

FIG. 2 is a view showing an example of the color filter type (B) of the present invention. In FIG. 2, 20 represents the color filter, 22 represents a support, and 24, 26 and 28 each represents a color-developing layer which develops a color different from that of each other color-developing layer. In the color filter, region "e" has a hue obtained by color-development of the color-developing layer 24, region "f" has a hue obtained by color-development of the color-developing layer 26 and region "g" has a hue obtained by color-development of the color-developing layer 28. Also, region "h" is a region where the color-developing layers 24, 26 and 28 all develop color.

In FIG. 1 and FIG. 2, each color developed region is a region where a latent image is formed in a latent image forming step.

Although no particular limitation is imposed on the color-developing layers, layers which develop color by heat, light or the action of both are preferably used. A photosensitive and heat-sensitive color-developing layer is preferably used in view of ease of patterning (color separation, processing and equipment). Although either a negative type in which an exposed portion develops a color or a positive type in which an unexposed portion develops a color may be used as this photosensitive and heat-sensitive color-developing layer, the positive type is desirable in view of ease of fixing.

As the color-developing layers in the color filter type (A), two or more layers that develop colors different from each other are used. For instance, three color-developing layers can be used which develop colors different from each other. The hues of the developed colors of the three layers may be freely selected. For example, in the case of a liquid crystal display, these layers may be three color-developing layers consisting of a yellow color-developing layer, a magenta color-developing layer and a cyan color-developing layer.

If these color-developing layers are positive type photosensitive and heat-sensitive color-developing layers, to be explained later, a cyan color-developing layer which is sensitive only to light having a specific wavelength range (center wavelength: $\lambda_1$), a yellow color-developing layer which is sensitive only to light having a wavelength range differing from the above wavelength range (center wavelength: $\lambda_2$) and a magenta color-developing layer which is sensitive only to light having a wavelength range differing from the above two wavelength ranges (center wavelength: $\lambda_3$) are used, and a laminate of the three color-developing layers is exposed to lights having the three different wavelength regions (center wavelengths: $\lambda_1$, $\lambda_2$ and $\lambda_3$) in respectively different selective regions. In the region to which the light having a center wavelength of $\lambda_1$ is applied a monomer is polymerized in the cyan color-developing layer. In the yellow color-developing layer and the magenta color-developing layer, photopolymerization in the same region is not initiated but an imagewise latent image is formed in each of the yellow color-developing layer and the magenta color-developing layer. Similar latent images are formed in the region to which light having a center wavelength of $\lambda_2$ is applied and in the region to which light having a center wavelength of $\lambda_3$ is applied in the same manner. After that, when heat is applied to the photosensitive and heat-sensitive color-developing layers in which these latent images are formed, only the regions where the latent image is formed (regions where no photopolymerization has been initiated) develop color. Accordingly, for example, in the region to which the light having a center wavelength of $\lambda_1$ is applied, the yellow color-developing layer and the magenta color-developing layer develop color, and the region is thereby made to be a red region by this subtractive color mixture. Also, in a region to which light is not applied at all during exposure, the yellow color-developing layer, the magenta color-developing layer and the cyan color-developing layer all develop colors and this region is thereby made to be a black region, which can be used as a black matrix.

As the color-developing layers which develop hues different from each other in the color filter type (B), three color-developing layers consisting of a blue color-developing layer, a green color-developing layer and a red color-developing layer may be used.

If these color-developing layers are positive type photosensitive and heat-sensitive color-developing layers as will be explained later, a blue color-developing layer which is sensitive only to light having a specific wavelength range (center wavelength: $\lambda_1$), a green color-developing layer which is sensitive only to a light having a wavelength range differing from the above wavelength range (center wavelength: $\lambda_2$) and a red color-developing layer which is sensitive only to a light having a wavelength range differing from the above two wavelength ranges (center wavelength: $\lambda_3$) are used. When a blue color-developing region is exposed to lights having center wavelengths of $\lambda_2$ and $\lambda_3$, respectively, by using digital light sources such as laser light, the green color-developing layer and red color-developing layer in the blue color-developing region are sensitized to initiate photopolymerization. Similarly, when a green developing region is exposed to lights having center wavelengths of $\lambda_1$ and $\lambda_3$, the blue color-developing layer and the red color-developing layer in the green color-developing region are sensitized to initiate photopolymerization. And a red color-developing region is exposed to lights having center wavelengths of $\lambda_1$ and $\lambda_2$ respectively to initiate photopolymerization of the blue and green color-developing layers. In this manner, latent images are formed in the blue, green and red color-developing layers. After that, when heat is applied to the photosensitive and heat-sensitive color-developing layers in which these latent images are formed, only the regions where the latent image is formed in the blue, green and red color-developing layers develop color. Also, in a region to which light is not applied at all during exposure, the blue color-developing layer, the green color-developing layer and the red color-developing layer all develop color and this region is thereby made to be a black region, which can be used as a black matrix.

If the color filter type (A) is made to develop color by using a negative type photosensitive and heat-sensitive color-developing layer, the negative type photosensitive and heat-sensitive color-developing layer includes a yellow color-developing layer, a magenta color-developing layer and a cyan color-developing layer, which are sensitive only to light having different wavelength ranges. The color filter is exposed to two types of light corresponding to each color-developing region in the same manner as in the case of the above color filter type (B) to photo-polymerize two layers, whereby the same sort of color filter can be obtained.

Further, if the color filter type (B) is prepared by developing color in a negative type photosensitive and heat-sensitive color-developing layer, a blue color-developing layer which is sensitive only to light having a specific wavelength range (center wavelength: $\lambda_1$), a green color-developing layer which is sensitive only to light having a wavelength range differing from the above wavelength range (center wavelength: $\lambda_2$) and a red color-developing layer which is sensitive only to light having a wavelength range differing from the above two wavelength ranges (center wavelength: $\lambda_3$) are used. When the blue color-developing region is exposed to light having center wavelength $\lambda_1$, only an exposed portion (a region where a latent image is formed) of the blue color-developing layer is photo-polymerized. Then, when heated, the region the latent image is formed develops a blue color.

Also, if the color-developing layers of the color filter type (B) are a blue color-developing layer, a green color-developing layer and a red color-developing layer, then a blue color-developing component, a green color-developing component and a red color-developing component may be used as the color-developing components contained in the layers. Alternatively, color-developing components contained in each layer may be combinations of a cyan color-developing component, a magenta color-developing component and a yellow color-developing component. Specifically, a mixture of a cyan color-developing component and a magenta color-developing component may be used as the blue color-developing component, a mixture of a cyan color-developing component and a yellow color-developing component may be used as the green color-developing component and a combination of a yellow color-developing component and a magenta color-developing component may be used as the red color-developing component. Also, when the blue, green and red color-developing components are obtained by mixing the yellow, magenta and cyan color-developing components, two or more types of any of the yellow (Y), magenta (M) and cyan (C) color-developing component may be mixed for adjusting the color (for instance, $M_1+M_2+M_3+C_1+C_2+C_3$).

As the support of the color filter, a light transmissive substrate such as glass or a plastic film is used. Examples of the plastic film include triacetyl cellulose (TAC), polyethylene terephthalate (PET), polyethylene naphthalate (PEN) and polyether sulfone (PES).

Next, the color filter forming material and the process for producing a color filter according to the present invention will be explained. The case where a photosensitive and heat-sensitive color-developing layer is used as the color-developing layer will be explained in detail hereinbelow.

II Color Filter Forming Material

1. Photosensitive and Heat-Sensitive Color-Developing Layer

As the photosensitive and heat-sensitive color-developing layer in the present invention, the following layers are exemplified.

(A) Positive Type Photosensitive and Heat-Sensitive Color-Developing Layer

A photosensitive and heat-sensitive color-developing layer including heat-responsive microcapsules in which color-developing components are encapsulated, and external components contained outside of the microcapsules which external components include at least a compound having a site which reacts with the color-developing component to develop a color and also having a polymerizable group in the same molecule, a spectral sensitizing dye, and an organic borate compound is used.

(B) Negative Type Photosensitive and Heat-Sensitive Color-Developing Layer

A photosensitive and heat-sensitive color-developing layer including heat-responsive microcapsules in which color-developing components are encapsulated, and external components contained outside of the microcapsules which external components include at least a substantially colorless compound which reacts with the color-developing component to develop a color, a substantially colorless compound having a polymerizable group and a site which suppresses the reaction between the color-developing component and the colorless compound, a spectral sensitizing dye, and an organic borate compound is used.

(1) Positive Type Photosensitive and Heat-Sensitive Color-Developing Layer (A)

1) Color-Developing Component

As a color-developing component (A) to be encapsulated in the microcapsules of the photosensitive and heat-sensitive color-developing layer, substantially colorless electron-donating dyes or diazonium salt compounds are exemplified. Examples of these dyes or compounds include cyan color-developing dyes or compounds, magenta color-developing dyes or compounds, yellow color-developing dyes or compounds, blue color-developing dyes or compounds, green color-developing dyes or compounds and red color-developing dyes or compounds. Also, a mixture of a cyan color-developing component and a magenta color-developing component may be used as a blue color-developing component, a mixture of a cyan color-developing component and a yellow color-developing component may be used as a green color-developing component and a mixture of a yellow color-developing component and a magenta color-developing component may be used as a red color-developing component. Also, when blue, green and red color-developing components are prepared by mixing yellow, magenta and cyan color-developing components, two or more types of any of the yellow (Y), magenta (M) and cyan (C) color-developing components may be mixed to adjust the color (for instance, $M_1+M_2+M_3+C_1+C_2+C_3$).

As the electron-donating colorless dye, conventionally known dyes may be used. Examples of these dyes include those described in the official gazette of JP-A No. 2000-199952, paragraphs 0051 to 0060.

Also, examples of the electron-donating colorless dyes which develop blue, green or red color include a triphenylmethane-phthalide, fluoran, phenothiazine, indolylphthalide, leucoauramine, spiropyran, rhodaminelactam, triphenylmethane and azaphthalide (refer to "TECHNOLOGY AND MARKET OF INDUSTRIAL DYES" published by CMC, pp. 223–229, and the like for more details).

The electron-donating colorless dye is used in an amount ranging preferably from 0.1 to 3 g/m$^2$ and more preferably from 0.1 to 1 g/m$^2$ in the photosensitive and heat-sensitive color-developing layer. If the amount to be used is less than 0.1 g/m$^2$, sufficient developed color density cannot be obtained, and if the amount exceeds 3 g/m$^2$, the qualities needed for application will be deteriorated, and therefore such amounts out of the defined range are undesirable.

As the diazonium salt compound, compounds represented by the following formula may be exemplified. This diazonium salt compound enters into a coupling reaction with a coupler when heated to develop a color, and is decomposed by light. A maximum absorption wavelength of the compound can be controlled by selecting the position and type of substituent at the Ar portion.

(Ar represents an aromatic cyclic group and X$^-$ represents an acid anion.)

Diazonium salt compounds of which Ar in the above formula is described in Japanese Patent Application Laid-Open (JP-A) No. 2000-199952, Paragraphs 0064 to 0067 may be used. Specific examples of the diazonium salt compound include, but are not limited to, those exemplified in the specification of Japanese Patent Application No. 11-36308, Paragraphs 0064 to 0075.

Examples of diazonium salt compounds which develop a blue, green or red color include, but are not limited to, dyes described in the above-cited "TECHNOLOGY AND MARKET OF INDUSTRIAL DYES" published by CMC, pp. 1–3 and pp. 13–38.

The maximum absorption wavelength λmax of a diazonium salt compound to be used in the present invention is preferably 450 nm or less and more preferably 290 to 440 nm, in view of effect. Also, the diazonium salt compound to be used in the present invention preferably has 12 or more carbon atoms, a solubility of 1% or less in water and a solubility of 5% or more in ethyl acetate.

In the present invention, these diazonium salt compounds may be used singly or in combinations of two or more in correspondence with various objectives such as adjustment of hue.

The diazonium salt compound is used in an amount ranging preferably from 0.01 to 3 g/m$^2$ and more preferably from 0.02 to 1.0 g/m$^2$ in the photosensitive and heat-sensitive color-developing layer. If the amount of the diazonium salt compound is less than 0.01 g/m$^2$, only insufficient color-developing ability will be obtained, and if the amount exceeds 3 g/m$^2$, the sensitivity will decrease and a need for a longer fixing time will arise, and therefore such amounts out of the above-defined range are undesirable.

2) Compound Having in the Same Molecule a Site Which Reacts with the Color-Developing Component to Develop a Color and a Polymerizable Group As a polymerizable electron-accepting compound, namely, as a compound having an electron-accepting compound and a polymerizable group, any compound may be used as long as it has a polymerizable group and can react with the electron-donating colorless dye which is one of the color-developing components to develop a color, and be photo-polymerized to cure the film.

Examples of the electron-accepting compound include 3-halo-4-hydroxybenzoic acid as described in JP-A No. 4-226455, methacryloxyethylester or acryloxyethylester of benzoic acid having a hydroxy group as described in JP-A No. 63-173682, esters of benzoic acid having a hydroxy group and hydroxymethylstyrene as described in JP-A No. 59-83693, JP-A No. 60-141587 and JP-A No. 62-99190, hydroxystyrene as described in EP No. 29323, N-vinylimidazole complex of zinc halide as described in JP-A No. 62-167077 and JP-A No. 62-16708, and compounds which can be synthesized with reference to, for example, electron-accepting compounds as described in JP-A No. 63-317558.

Among these compounds having an electron-accepting group and a polymerizable group in the same molecule, 3-halo-4-hydroxybenzoic acid as represented by the following formula is preferable.

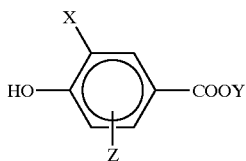

X represents a halogen atom and preferably a chlorine atom; Y represents a monovalent group having a polymerizable ethylene group, preferably an aralkyl group having a vinyl group, an acryloyloxyalkyl group or a methacryloyloxyalkyl group and more preferably an acryloyloxyalkyl group having 5 to 11 carbon atoms or methacryloyloxyalkyl group having 6 to 12 carbon atoms; and Z represents a hydrogen atom, an alkyl group or an alkoxyl group.

Examples of 3-halo-4-hydroxybenzoic acid and other specific examples as the polymerizable electron-accepting compound include those exemplified in JP-A No. 2000-199952, Paragraphs 0082 to 0087.

The polymerizable electron-accepting compound having a polymerizable group may be used in combination with the electron-donating colorless dye.

In this case, the electron-accepting compound is used in an amount of preferably 0.5 to 20 parts by weight and more preferably 3 to 10 parts by weight based on 1 part by weight of the electron-donating colorless dye to be used. If the amount of the electron-accepting compound is less than 0.5 parts by weight, sufficient developed color density cannot be obtained, and if the amount exceeds 20 parts by weight, the sensitivity will decrease and the coating qualities deteriorate, and therefore such amounts out of the defined range are undesirable.

Examples of a method used to obtain a predetermined maximum color density when these electron-donating colorless dye and electron-accepting compound are used as the color-developing components include a method in which the types of electron-donating dye and electron-accepting compound are selected and a method in which the coating amount of the formed photosensitive and heat-sensitive color-developing layer is controlled.

Also, as the coupler compound having a polymerizable group and used in the photosensitive and heat-sensitive color-developing layer, any compound may be used as long as it has a polymerizable group, reacts with a diazonium salt compound which is one of the color-developing components and can be photo-polymerized to cure the film.

The coupler compound couples with a diazo compound in a basic atmosphere or neutral atmosphere to form a dye and may be used in plural, in correspondence with various purposes such as adjustment of hue.

Specific examples of the coupler compound include, but are not limited to, compounds exemplified in JP-A No. 2000-199952, Paragraphs 0090 to 0096.

The coupler compound may be added in an amount ranging from 0.02 to 5 g/m$^2$ and more preferably 0.1 to 4 g/m$^2$ in the photosensitive and heat-sensitive color-developing layer in view of effect. If the amount added is less than 0.02 g/m$^2$, the color-developing ability will be inferior and therefore such an amount is undesirable, and if the amount exceeds 5 g/m$^2$, the coating qualities will deteriorate and therefore such an amount is also undesirable.

The coupler compound may be used in combination with the diazonium salt compound. In this case, the coupler compound is used in an amount of preferably 0.5 to 20 parts by weight and more preferably 1 to 10 parts by weight based on 1 part by weight of the diazonium salt compound. If the amount is less than 0.5 parts by weight, only insufficient color-developing ability can be obtained, and if the amount exceeds 20 parts by weight, coating qualities will deteriorate, and therefore such amounts out of the defined range are undesirable.

In order to achieve a desired maximum color density in the case of using these diazonium salt compound and coupler compound as the color-developing components, the types of diazonium salt compound and coupler compound may be selected and the coating amount of the photosensitive and heat-sensitive color-developing layer to be formed may be controlled.

The coupler compound may be used by adding a water-soluble polymer together with other components and solid-dispersing this mixture using a sand mill. Alternatively, the coupler compound may be used in the form of an emulsion by emulsifying it together with a suitable emulsifying adjuvant. Here, no particular limitation is imposed on the solid-dispersing method or emulsifying method, and conventionally known methods may be used. Details of such methods are described in JP-A No. 59-190886, JP-A No. 2-141279 and JP-A No. 7-17145.

3) Spectral Sensitizing Dye

As the spectral sensitizing dye to be used in the present invention, an organic dye is used and a suitable dye may be optionally selected from known compounds. Organic dyes having a maximum absorption wavelength of 300 to 1000 nm are preferable.

High sensitivity can be obtained by selecting a suitable dye from organic dyes having the aforementioned absorption wavelength range such that the light-sensitive wavelength of the dye conforms to a light source to be used. A blue, green or red light source, an infrared laser, or the like may be appropriately selected as the light source to be used for image exposure.

Therefore, for example, when a color image is formed using a multicolor recording material obtained by laminating monocolor photosensitive and heat-sensitive color-developing layers which develop hues different from each other, an organic dye which functions as a spectral sensitizing dye having a different absorption wavelength is provided in each monocolor layer having a different developing hue and a light source conforming to the absorption wavelength of the organic dye is used. Each layer (each color) thus forms a highly sensitive and sharp image even in a recording material obtained by laminating plural layers, making it possible to achieve a highly sensitive and sharp multicolor recording material.

Specific examples of the organic dye include those described in official patent gazettes concerning "ORGANIC BORATE SALT COMPOUNDS", "Research Disclosure, Vol. 200, December 1980, Item 20036", "SENSITIZERS" (p.160–p.163, Kodansha; edited by TOKUMARU Katsuki and OHGAWARA Shin, 1987) as will be explained later. As the organic dye contained in the photopolymerizable composition of the present invention, any one of cationic, anionic and nonionic dyes may be selected.

Specific examples of the organic dye include 3-ketocumarin compounds described in JP-A No. 58-15603, thiopyrylium salts described in JP-A No. 58-40302, naphthothiazolemerocyanine compounds described in Japanese Patent Application Publication (JP-B) Nos. 59-28328, 60-53300, merocyanine compounds described in each of JP-B Nos. 61-9621, 62-3842 and JP-A Nos. 59-89303, 60-60104, and merocyanine dyes and hemioxanol dyes containing thiobarbituric acid and cyanine or hemicyanine and merocyanine having an indolenine nucleus as described in each of JP-A Nos. 62-150242, 64-59345 and JP-B Nos. 8-9643 and each specification of Japanese Patent Application Nos. 11-20089, 11-323838, 11-367432, 2000-34935, 2000-38861, 2000-38872 and 2000-142112.

Also, dyes described in "CHEMISTRY OF FUNCTIONAL DYES" (1981, CMC Shuppansha, p.393–p.416), "COLORANTS" (60[4]212–224 (1987)) and the like may be exemplified. Specific examples of these dyes include cationic methine dyes, cationic carbonium dyes, cationic quinoneimine dyes, cationic indoline dyes and cationic styryl dyes.

These organic dyes include keto dyes such as cumarin (including ketocumarin and sulfonocumarin) dyes, merostyryl dyes, oxonol dyes, hemioxonol dyes; non-keto dyes such as non-ketopolymethine dyes, triarylmethane dyes, xanthene dyes, anthracene dyes, rhodamine dyes, acridine dyes, aniline dyes and azo dyes; non-ketopolymethine dyes such as azomethine dyes, cyanine dyes, carbocyanine dyes, dicarbocyanine dyes, tricarbocyanine dyes, hemicyanine dyes and styryl dyes; and quinoneimine dyes such as azine dyes, oxazine dyes, thiazine dyes, quinoline dyes and thiazole dyes.

Specific examples (1-1 to 3-15) of the cationic, anionic and nonionic organic dyes are given below, but are not intended to be limiting of the present invention.

(Cationic Organic Dyes)

1-1
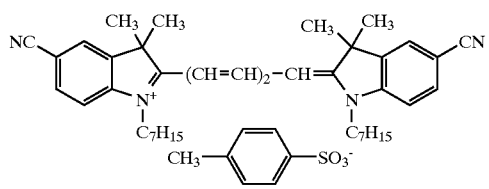

1-2
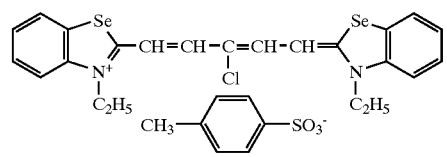

1-3
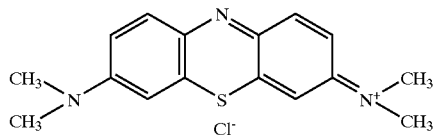

1-4
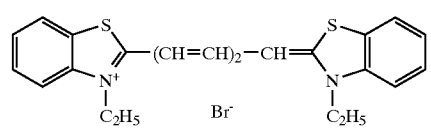

1-5
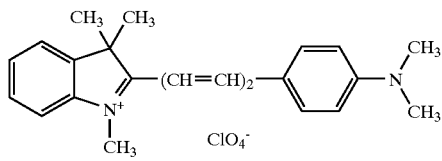

1-6
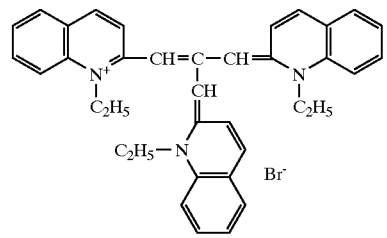

1-7
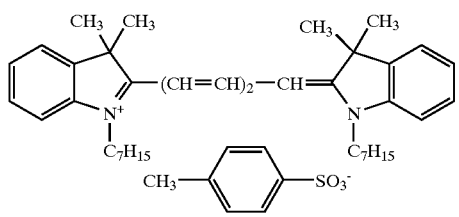

1-8
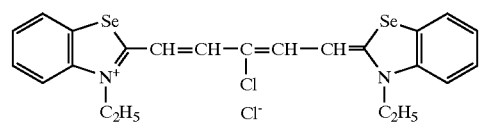

1-9
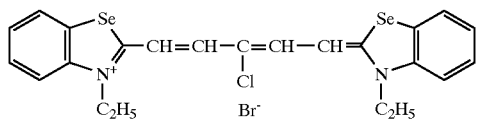

1-10
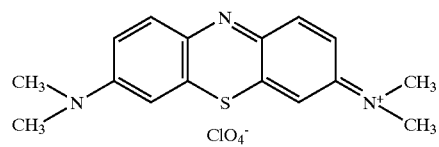

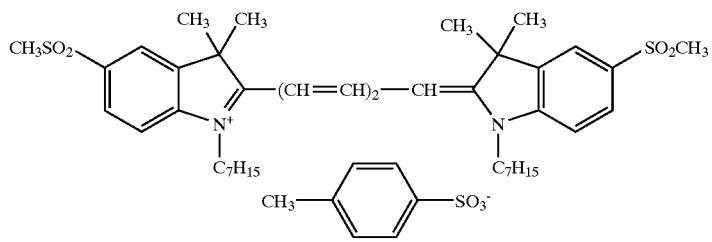
1-11
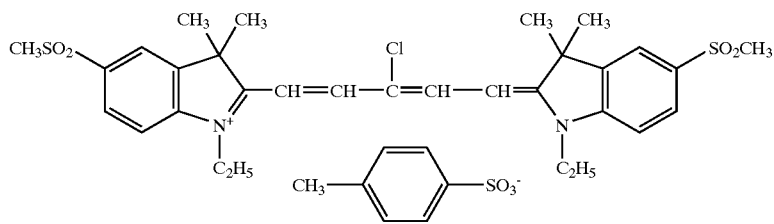
1-12
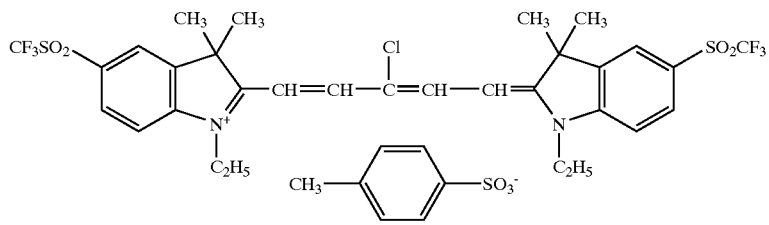
1-13
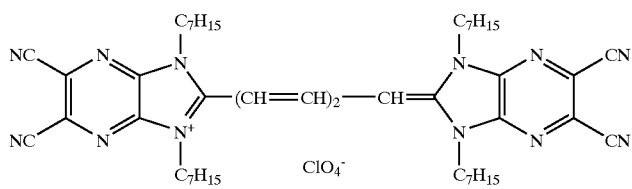
1-14
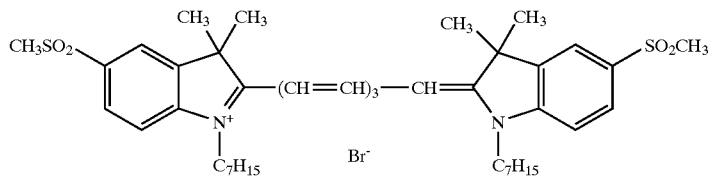
1-15
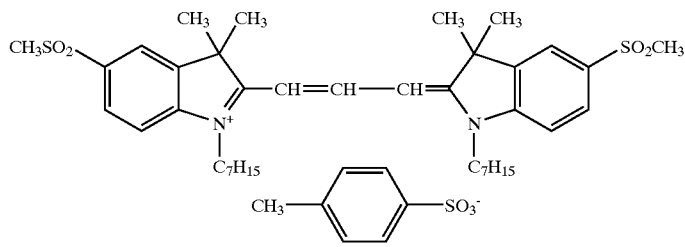
1-16

-continued
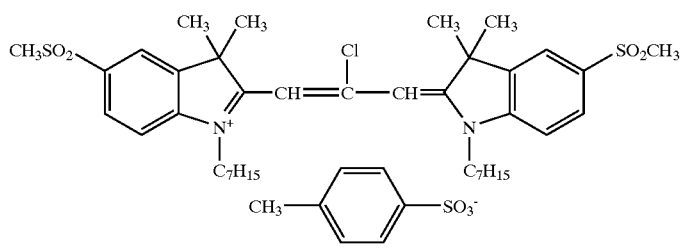
1-17
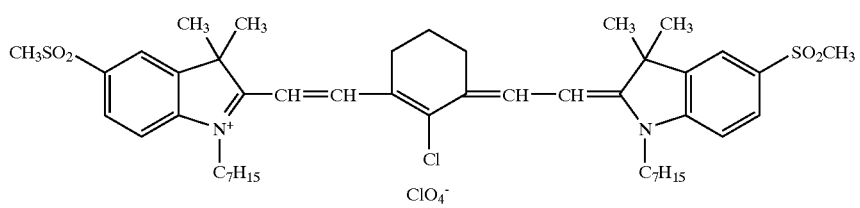
1-18
(Anionic Organic Dyes)
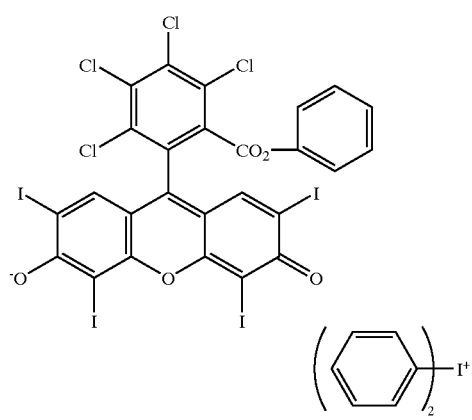
2-1
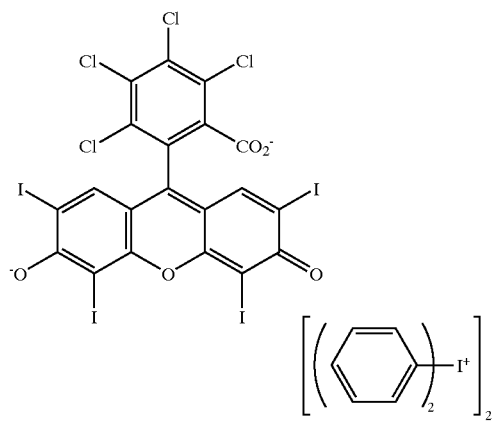
2-2
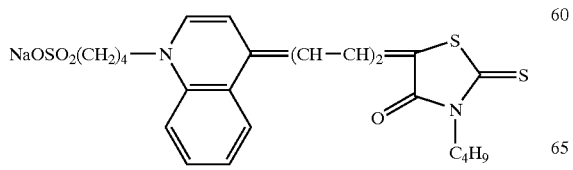
2-3
-continued
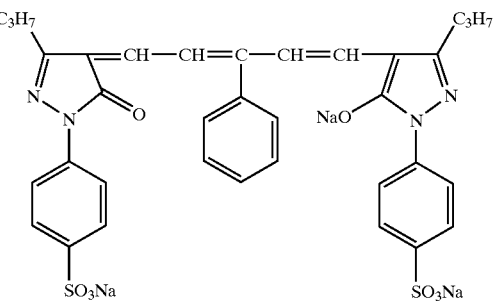
2-4
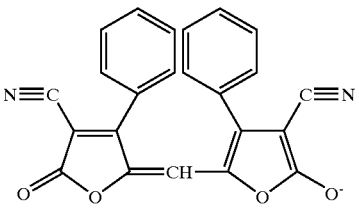
2-5
(Nonionic Organic Dyes)
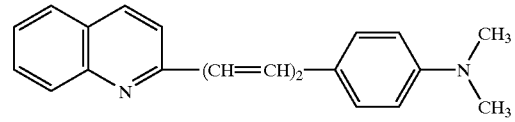
3-1
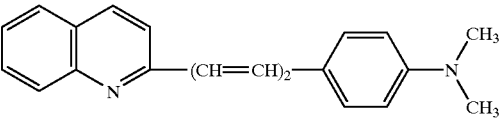
3-2

-continued

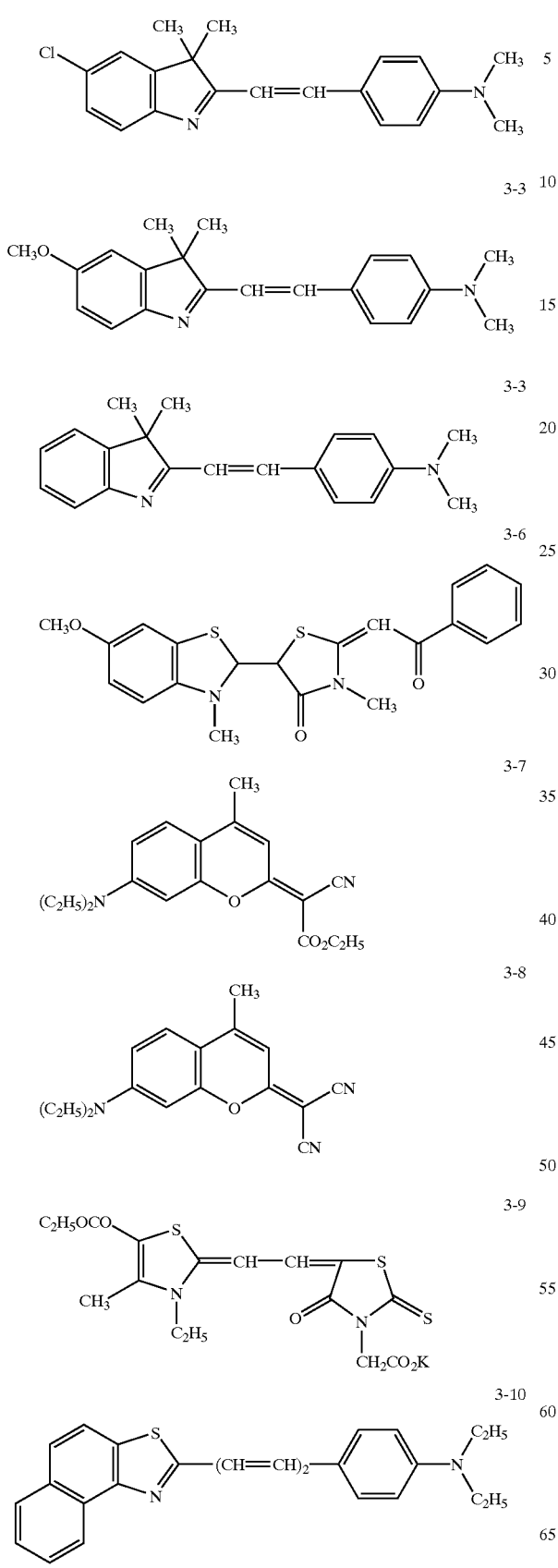

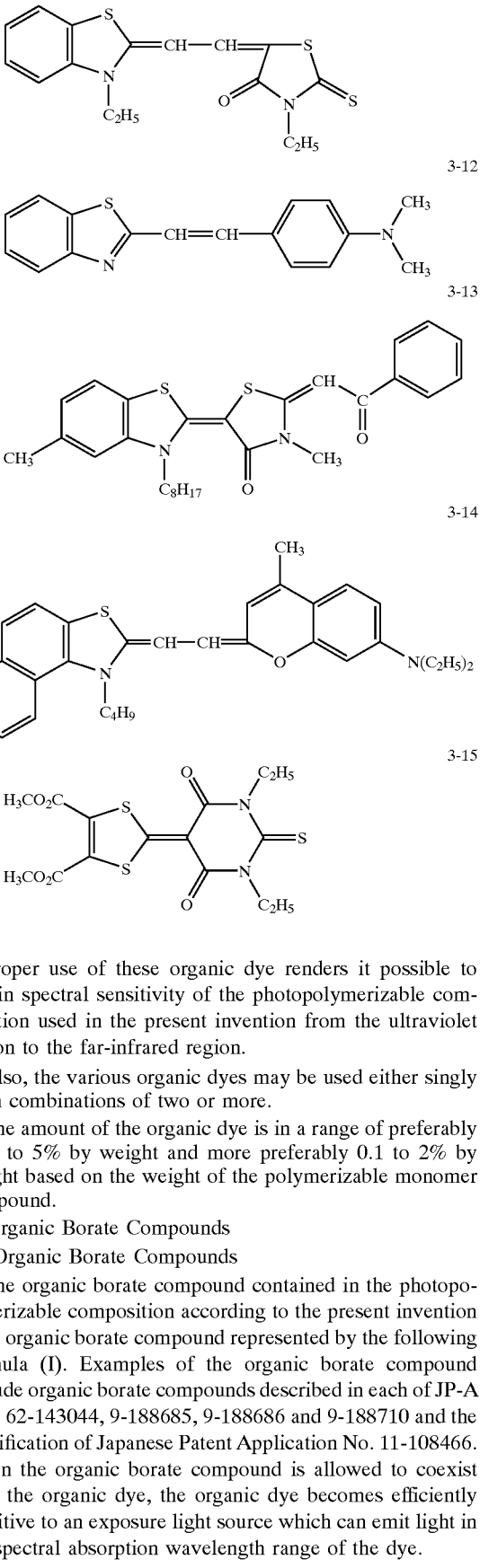

Proper use of these organic dye renders it possible to obtain spectral sensitivity of the photopolymerizable composition used in the present invention from the ultraviolet region to the far-infrared region.

Also, the various organic dyes may be used either singly or in combinations of two or more.

The amount of the organic dye is in a range of preferably 0.01 to 5% by weight and more preferably 0.1 to 2% by weight based on the weight of the polymerizable monomer compound.

4) Organic Borate Compounds
(1) Organic Borate Compounds

The organic borate compound contained in the photopolymerizable composition according to the present invention is an organic borate compound represented by the following formula (I). Examples of the organic borate compound include organic borate compounds described in each of JP-A Nos. 62-143044, 9-188685, 9-188686 and 9-188710 and the specification of Japanese Patent Application No. 11-108466. When the organic borate compound is allowed to coexist with the organic dye, the organic dye becomes efficiently sensitive to an exposure light source which can emit light in the spectral absorption wavelength range of the dye.

Therefore, high sensitivity is attained and the generation of radicals can be controlled using a suitable light source from the ultraviolet to the far-infrared region.

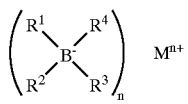

Formula (1)

M represents a cation selected from an alkali metal atom, quaternary ammonium, pyridinium, quinolinium, diazonium, morpholinium, tetrazolium, acridinium, phosphonium, sulfonium, oxosulfonium, sulfur, oxygen, carbon, halogenium, Cu, Ag, Hg, Pd, Fe, Co, Sn, Mo, Cr, Ni, As and Se. n denotes an integer from 1 to 6. $R^1$, $R^2$, $R^3$ and $R^4$ respectively represent a halogen atom, a substituted or unsubstituted alkyl group, a substituted or unsubstituted alkenyl group, a substituted or unsubstituted alkynyl group, an alicyclic group, a substituted or unsubstituted aryl group, a substituted or unsubstituted alkaryl group, a substituted or unsubstituted aryloxyl group, a substituted or unsubstituted aralkyl group, a substituted or unsubstituted heterocyclic group or a substituted or unsubstituted silyl group. Here, $R^1$, $R^2$, $R^3$ and $R^4$ may be the same or different and two or more groups among them may be joined to form a cyclic structure.

Preferable examples of the borate anion include tetramethyl borate, tetraethyl borate, tetrabutyl borate, triisobutylmethyl borate, di-n-butyl-di-t-butyl borate, tetra-n-butyl borate, tetraphenyl borate, tetra-p-chlorophenyl borate, tetra-m-chlorophenyl borate, tri-m-chlorophenyl-n-hexyl borate, triphenylmethyl borate, triphenylethyl borate, triphenylpropyl borate, triphenyl-n-butyl borate, trimesitylbutyl borate, tritolylisopropyl borate, triphenylbenzyl borate, tetraphenyl borate, tetrabenzyl borate, triphenylphenetyl borate, triphenyl-p-chlorobenzyl borate, triphenylethenylbutyl borate, di(α-naphthyl)-dipropyl borate, triphenylsilyltriphenyl borate, tritolylsilyltriphenyl borate and tri-n-butyl (dimethylphenylsilyl) borate.

Specific examples (1) to (36) and (A-1) to (A-40) of the organic borate compound are given below, but are not intended to be limiting of the present invention.

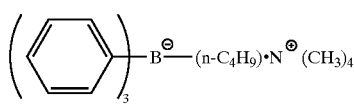

(1)

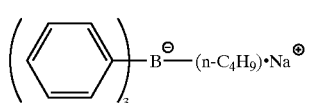

(1-i)

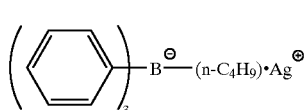

(1-ii)

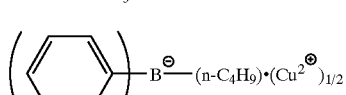

(1-iii)

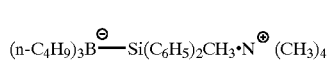

(2)

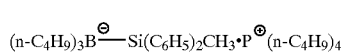

(3)

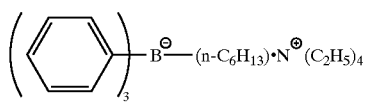

(4)

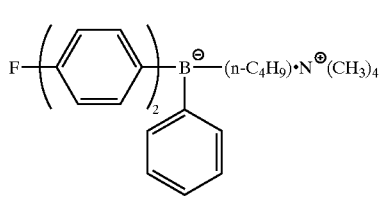

(5)

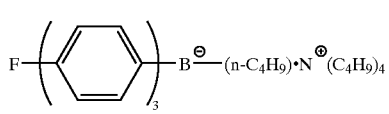

(6)

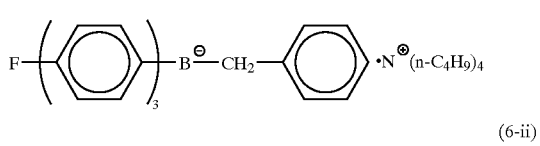

(6-i)

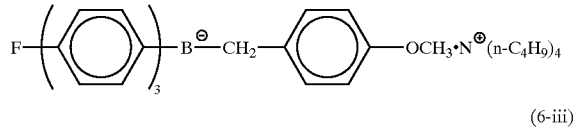

(6-ii)

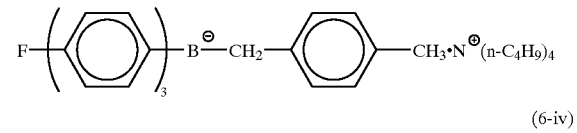

(6-iii)

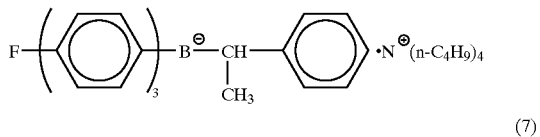

(6-iv)

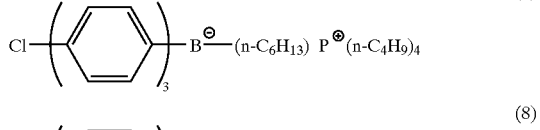

(7)

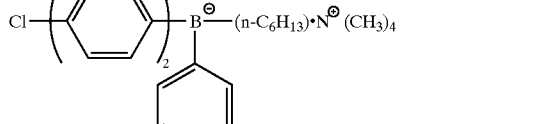

(8)

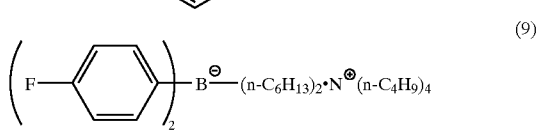

(9)

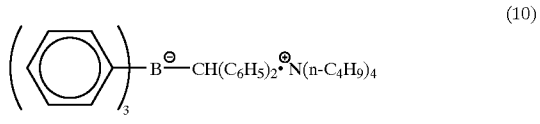

(10)

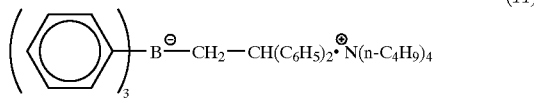

(11)

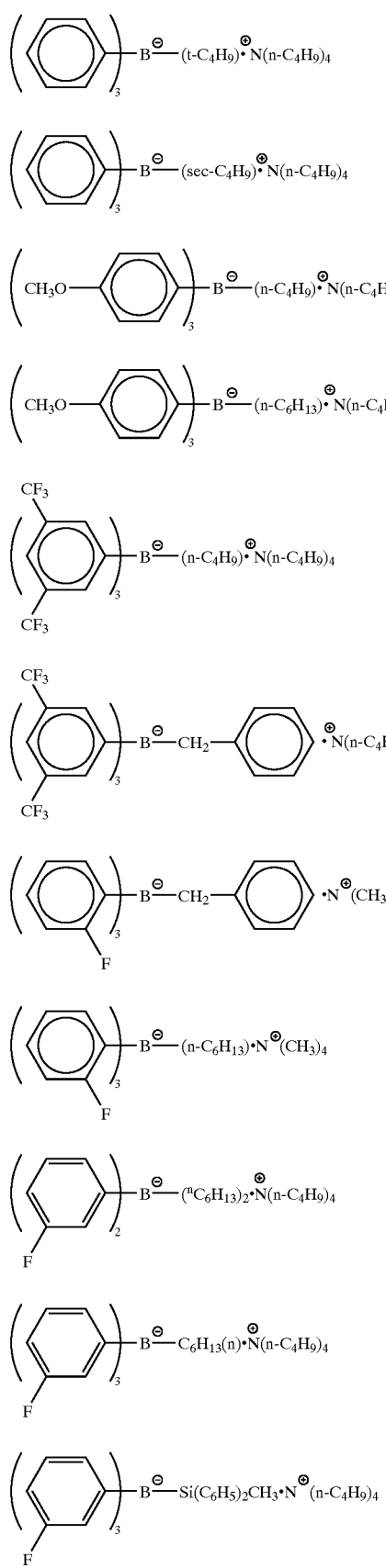
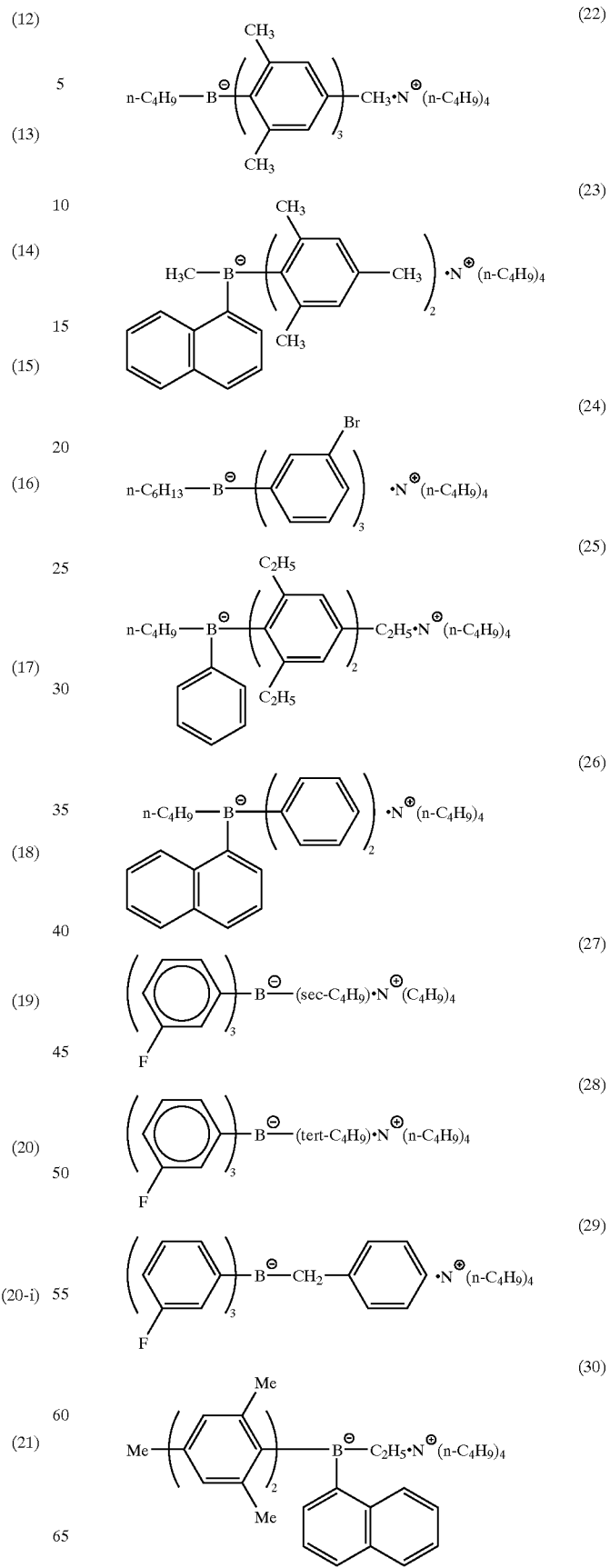

(31) 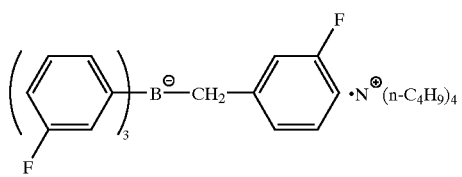
A-3 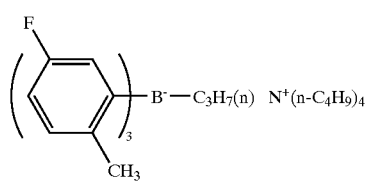
(32) 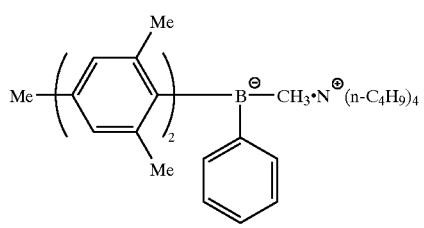
A-4 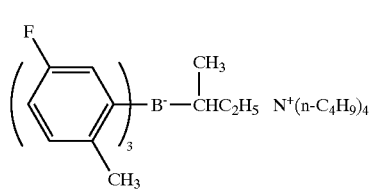
(33) 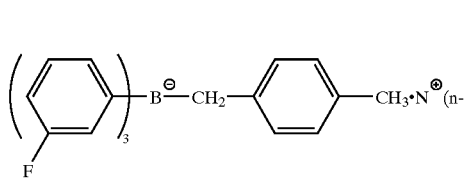
A-5 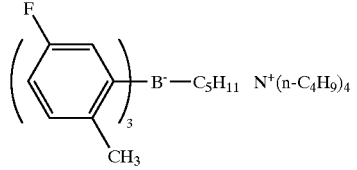
(34) 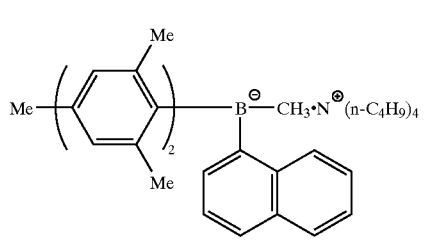
A-6 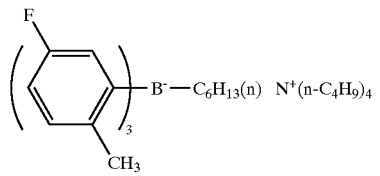
(35) 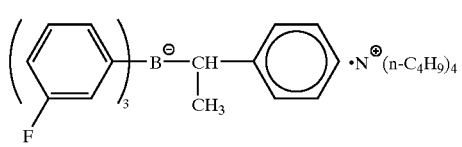
A-7 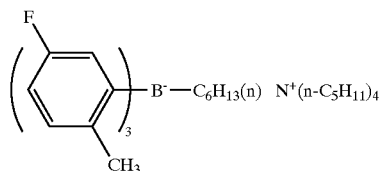
(36) 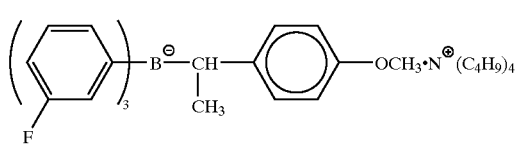
A-8 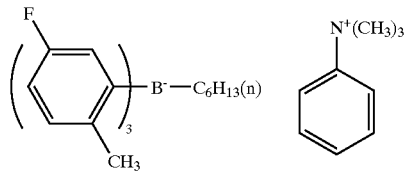
A-1 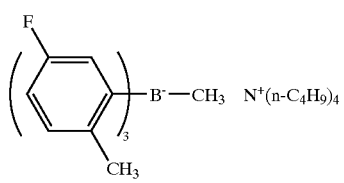
A-9 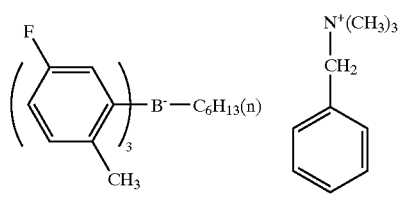
A-2 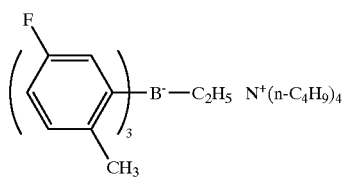
A-10 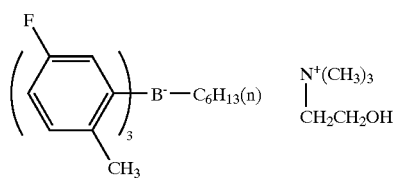

-continued
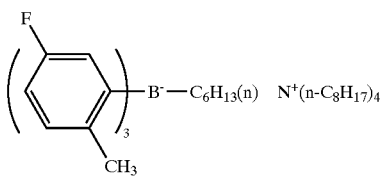 A-11
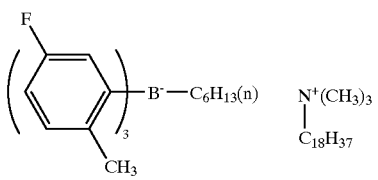 A-12
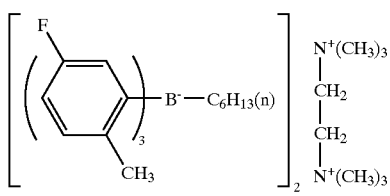 A-13
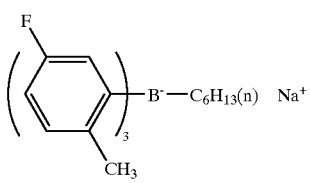 A-14
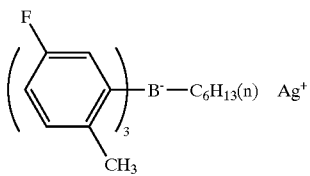 A-15
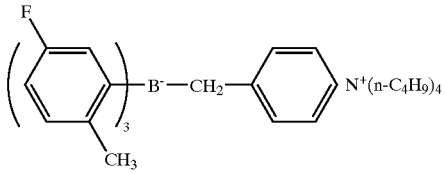 A-16
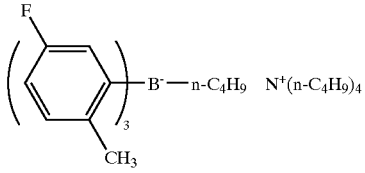 A-17
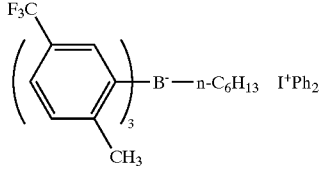 A-18
-continued
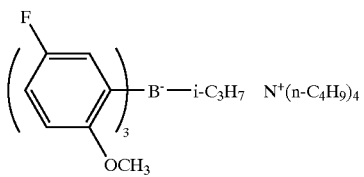 A-19
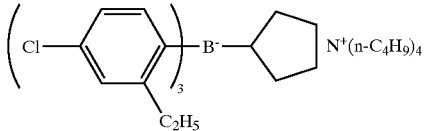 A-20
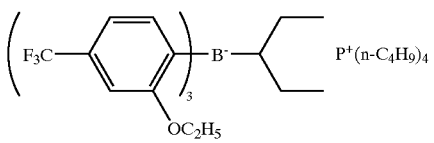 A-21
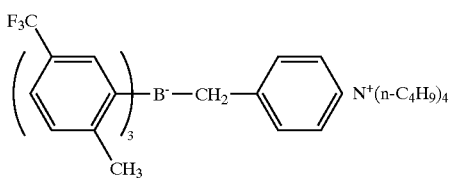 A-22
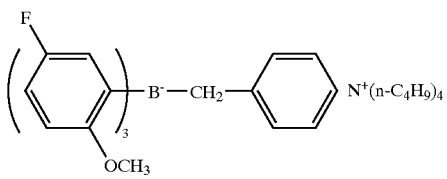 A-23
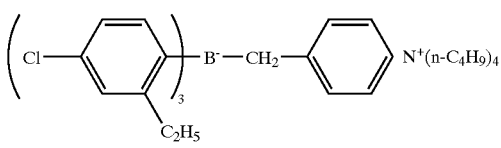 A-24
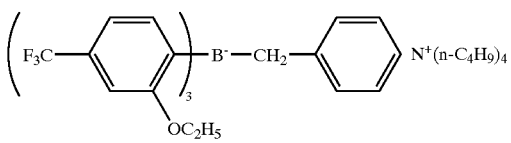 A-25
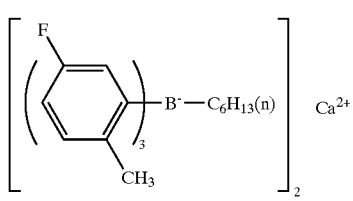 A-26
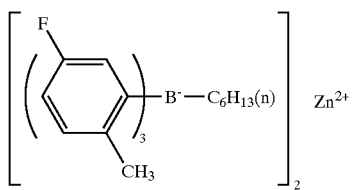 A-27

-continued

A-28 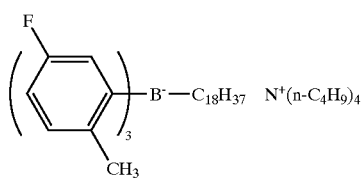

A-29 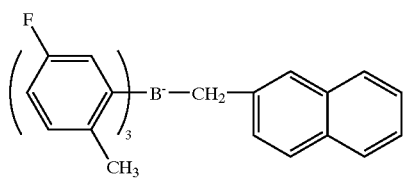

A-30 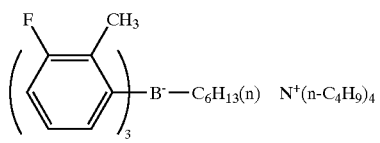

A-31 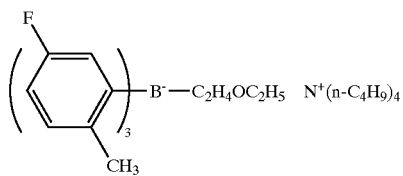

A-32 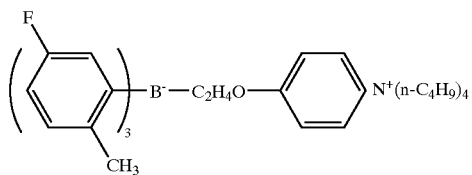

A-33 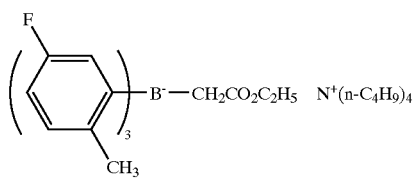

A-34 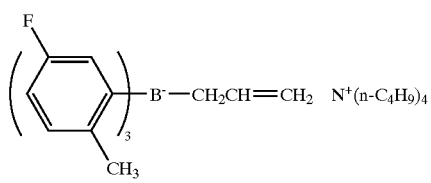

A-35 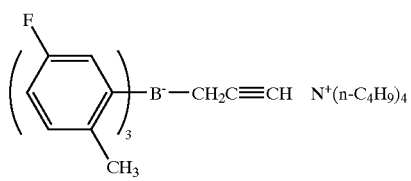

A-36 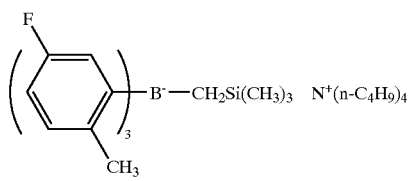

A-37 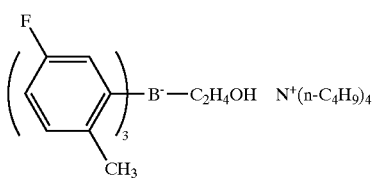

A-38 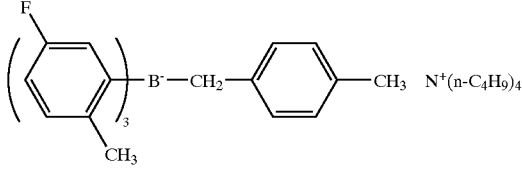

A-39 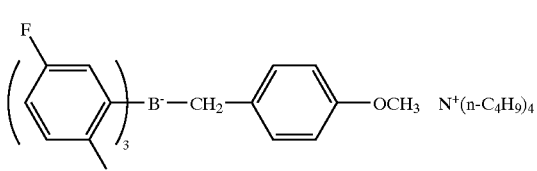

A-40 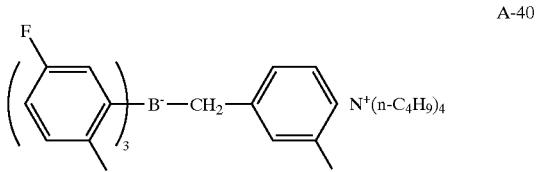

The amount (in mole) of the organic borate compound to be used is preferably in a range from 0.1 to 50 times and more preferably in a range from 1 to 20 times as much as that of the organic dye (spectral sensitizing dye) to be used. If the amount is smaller than 0.1 times, a sufficient polymerization sensitivity and color extinction rate during fixing cannot be obtained, and if the amount is larger than 50 times, these qualities will be saturated and therefore the amount is excessive.

A compound such as those exemplified in JP-A No. 2000-199952, Paragraphs 0145 to 0151 and interacting with the organic dye may also be used in the photopolymerizable composition of the present invention. As this compound which interacts with the organic dye, benzoin ethers, S-triazine derivatives having a trihalogen substituted methyl group and organic peroxides or azinium salt compounds, as well as naphthoquinoneazides, iminoquinonediazides, diazomethanedisulfonyl compounds and diazonium salts are preferable.

(2) Negative Type Photosensitive and Heat-Sensitive Color-Developing Layer (B)

The same color-developing components, spectral sensitizing dyes and organic borate compounds that are used in the photosensitive and heat-sensitive color-developing layer (A) above are used in the photosensitive and heat-sensitive color-developing layer (B).

1) Substantially Colorless Compound Which Reacts with the Color-Developing Component to Develop Color As the substantially colorless compound which reacts with the color-developing component to develop color, an electron-accepting compound is used when the color-developing component is an electron-donating colorless dye. Specific examples of this electron-accepting compound include phenol derivatives, salicylic acid derivatives, metal salts of aromatic carboxylic acid, acid clay, bentonite, novolac resins, metal treated novolac resins and metal complexes.

More specific examples include materials described in JP-B Nos. 40-9309, 45-14039, JP-A Nos. 52-140483, 48-51510, 57-210886, 58-87089, 59-11286, 60-176795, 61-95988 and the like.

Given as specific examples of these compounds are those exemplified in JP-A No. 2000-199952, Paragraphs 0109 to 0110.

The electron-accepting compound is preferably used in an amount of 5 to 1000% by weight relative to the electron-donating colorless dye.

A coupler is used when the color-developing component is a diazonium salt compound. The coupler is a compound which couples with the diazonium salt compound in a basic atmosphere or neutral atmosphere to form a dye. Plural types of coupler may be used together corresponding to various objectives such as adjustment of hue. Examples of the coupler may include so-called active methylene compounds having a methylene group adjacent to a carbonyl group, phenol derivatives and naphthol derivatives. These couplers may be used through appropriate selection as far as the use thereof conforms to the purposes of the present invention.

Specific examples of the coupler compound include those described in JP-A No. 2000-199952, Paragraphs 0119 to 0121.

Further, as the coupler compound, those described in each of JP-A Nos. 4-201483, 7-223367, 7-223368, 7-323660, 5-278608, 5-297024, 6-18669, 6-18670, 7-316280 and the like may be used. Those described in Japanese Patent Application Nos. 8-12610, 8-30799, JP-A Nos. 9-216468, 9-216469, 9-319025, 10-35113, 10-193801 and 10-264532, which were previously submitted by the applicant of this application, may also be used.

The coupler compound is added in a range between preferably 0.02 and 5 $g/m^2$ and more preferably 0.1 and 4 $g/m^2$ in the photosensitive and heat-sensitive color-developing layer, in view of effect. If the amount to be added is less than 0.02 $g/m^2$, only insufficient developed color density can be obtained, and if the amount exceeds 5 $g/m^2$, coating qualities will be impaired, and therefore such amounts out of the defined range are undesirable.

2) Substantially Colorless Compound Having in the Same Molecule a Polymerizable Group and a Site Which Suppresses Reaction between the Color-Developing Component and the Colorless Compound 1)

When the color-developing component is an electron-donating colorless dye, examples of the substantially colorless compound having a polymerizable group and a site which suppresses a reaction between the color-developing component and the colorless compound in the same molecule include photopolymerizable monomers which have a function to suppress a reaction between the electron-donating colorless dye and the electron-accepting compound and have at least one vinyl group in the molecule. Specific examples of these photopolymerizable monomers include acrylic acid and its salts, acrylates, acrylamides; methacrylic acid and its salts, methacrylates, methacrylamides; maleic acid anhydride, maleates; itaconic acid, itaconates; styrenes; vinyl ethers; vinylesters; N-vinyl heterocyclic rings; aryl ethers; and arylesters.

Among these monomers, photopolymerizable monomers having plural vinyl groups in the molecule are preferably used. Examples of such a monomer include acrylates and methacrylates of polyhydric alcohols such as trimethylolpropane and pentaerythritol; acrylates and methacrylates of polyvalent phenols or bisphenols such as resorcinol, pyrogallol and fluoroglucinol; acrylate or methacrylate terminal epoxy resins; and acrylate or methacrylate terminal polyesters.

Among these monomers, ethylene glycol diacrylate, ethylene glycol dimethacrylate, trimethylolpropane triacrylate, pentaerythritol tetraacrylate, dipentaerythritol hydroxypentaacrylate, hexanediol-1,6-dimethacrylate and diethylene glycol dimethacrylate are particularly preferable.

The molecular weight of the compound is preferably about 100 to 5000 and more preferably about 300 to 2000.

The compound is used in a range from preferably 0.1 to 10 parts by weight and more preferably 0.5 to 5 parts by weight based on 1 part by weight of the substantially colorless compound which reacts with the color-developing component to develop a color. If the amount is less than 0.1 part by weight, no latent image can be formed in the exposure step, and if the amount exceeds 10 parts by weight, the developed color density will be reduced, and therefore such amounts out of the defined range are undesirable.

When the color-developing component is a diazonium salt compound, the substantially colorless compound having a polymerizable group and a site which suppresses a reaction between the color-developing component and the colorless compound in the same molecule is preferably a photopolymerizable monomer, which is not a metal salt compound, having an acidic group having the effect of suppressing a coupling reaction between the diazonium salt compound and the coupler.

Examples of the compound include those described in JP-A No. 2000-199962, Paragraphs 0128 to 0130.

The compound is used in an amount ranging preferably from 0.1 to 10 parts by weight and more preferably 0.5 to 5 parts by weight based on 1 part by weight of the substantially colorless compound which reacts with the color-developing component to develop a color. If the amount is less than 0.1 parts by weight, no latent image can be formed in an exposure step, and if the amount exceeds 10 parts by weight, the developed color density will be reduced, and therefore such amounts out of the defined range are undesirable.

(3) Other Components to be Added to the Photosensitive and Heat-Sensitive Color-Developing Layer 1) Polymerization Adjuvant A reducing agent such as an oxygen scavenger or a chain transfer adjuvant of an active hydrogen donor and other compounds promoting polymerization in a chain transfer manner, may be added to the photopolymerizable composition of the present invention for the purpose of promoting the polymerization reaction and also as an adjuvant.

Examples of the oxygen scavenger include a phosphine, phosphonate, phosphite, argentous salt or other compound which is easily oxidized by oxygen.

Examples of the chain transfer adjuvant include N-phenylglycine, trimethylbarbituric acid, N,N-dimethyl-2,6-diisopropylaniline and N,N-2,4,6-pentamethylanilic acid. Moreover, thiols, thioketones, trihalomethyl compounds, lophine dimer compounds, iodonium salts, sulfonium salts, azinium salts, organic peroxides and azides are useful as the polymerization promoter.

2) Coupling Promoter

In the present invention, organic bases such as tertiary amines, piperidines, piperazines, amidines, formamidines, pyridines, guanidines and morpholines may be used for the purpose of promoting the coupling reaction.

These bases are described in, for instance, JP-A Nos. 57-123086, 60-49991, 60-94381, 9-71048, 9-77729 and 9-77737.

Although there is no particular limitation to the amount of the organic base to be used, the organic base is preferably used in an amount ranging from 1 to 30 mols based on 1 mol of the diazonium salt.

3) Color-Developing Adjuvant

In addition, a color-developing adjuvant may be added for the purpose of promoting the color-developing reaction.

Examples of the color-developing adjuvant include phenol derivatives, naphthol derivatives, alkoxy substituted benzenes, alkoxy substituted naphthalenes, hydroxy compounds, carboxylic acid amide compounds and sulfonamide compounds.

It is thought that a high developed color density can be obtained because these compounds lower the melting point of the coupler compound or the basic material and have the ability to improve thermal transmittance of microcapsule walls.

4) Binder

As the binder, other than a water-soluble polymer used when color-developing components, explained later, are encapsulated, and a binder used when components contained outside of the capsule are emulsion-dispersed, solvent-soluble polymers such as polystyrene, polyvinylformal; polyvinylbutyral; acrylic resins such as polymethyl acrylate, polybutyl acrylate, polymethyl methacrylate, polybutyl methacrylate, copolymers of acrylates and/or methacrylates; phenol resins; styrene-butadiene resin; ethyl cellulose; epoxy resins; and urethane resins; or polymer latexes of these polymers may be used.

Among these polymer materials, gelatin and polyvinyl alcohol are preferable.

5) Others

Various surfactants may be used in the photosensitive and heat-sensitive color-developing layer according to the present invention for various purposes such as coating property improvement, static prevention, sliding characteristic improvement, promotion of emulsion-dispersion, prevention of adhesion and the like.

Examples of surfactants which may be used include: nonionic surfactants such as saponin, polyethylene oxide, and polyethylene oxide derivatives such as an alkyl ether of polyethylene oxide; anionic surfactants such as an alkyl sulfonate, alkylbenzene sulfonate, alkylnaphthalene sulfonate, alkyl sulfate, N-acyl-N-alkyltaurines, sulfosuccinates and sulfoalkylpolyoxyethylenalkylphenyl ethers; amphoteric surfactants such as alkylbetaines and alkylsulfobetaines; and cationic surfactants such as aliphatic or aromatic quaternary ammonium salts.

Other additives besides the aforementioned additives may be compounded in the photosensitive and heat-sensitive color-developing layer according to need.

For example, dyes, ultraviolet absorbers, plasticizers, fluorescent whitening agents, matt agents, coating adjuvants, hardeners, antistatic agents and sliding improvers may be added.

Typical examples of the additives are described in "Research Disclosure, Vol. 176" (December, 1978, Item 17643) and "Research Disclosure, Vol. 187" (November, 1979, Item 18716).

A hardener may also be used, according to need, in the photosensitive and heat-sensitive color-developing layer according to the present invention.

Particularly, a hardener is preferably used together in the protective layer to decrease adhesiveness of the protective layer. As the hardener, for example, a "gelatin hardener" used for the production of a photographic light-sensitive material is useful. For example, aldehyde compounds such as formaldehyde or glutaraldehyde, reactive halogen compounds described in U.S. Pat. No. 3,635,718, compounds having a reactive ethylenic unsaturated group as described in U.S. Pat. No. 3,635,718, aziridine compounds described in U.S. Pat. No. 3,017,280, epoxy compounds, halogenocarboxyaldehydes such as mucochloric acid and dioxanes such as dihydroxydioxane or dichlorodioxane as described in U.S. Pat. No. 3,091,537, vinylsulfones described in U.S. Pat. Nos. 3,642,486 and 3,687,707, vinylsulfone precursors described in U.S. Pat. No. 3,841,872 or ketovinyls described in U.S. Pat. No. 3,640,720 may be used. Also, chrome alum, zirconium sulfate, boric acid or the like may be used as an inorganic hardener.

Among these compounds, compounds such as 1,3,5-triacryloyl-hexahydro-s-triazine, 1,2-bisvinylsulfonyl-methane, 1,3-bis(vinylsulfonylmethyl)propanol-2, bis($\alpha$-vinylsulfonylacetamide)ethane, 2,4-dichloro-6-hydroxy-s-triazine/sodium salt, 2,4,6-triethyleneimino-s-triazine and boric acid are preferable.

The hardener is preferably added in an amount ranging from 0.5 to 5% by weight based on the amount of the binder to be used.

The color filter forming material of the present invention comprises at least two photosensitive and heat-sensitive color-developing layers as described above and the plural photosensitive and heat-sensitive color-developing layers develop hues differing from each other. Explanations will be furnished below taking a case of three photosensitive and heat-sensitive color-developing layers as an example; however, the same concepts may be applied to a case of providing four or more photosensitive and heat-sensitive color-developing layers.

It is preferable that each photosensitive and heat-sensitive color-developing layer of the color filter forming material used to produce the color filters (A) and (B) of the present invention contains spectral sensitizing compounds ($C\lambda_1$, $C\lambda_2$, $C\lambda_3$) having absorption wavelengths (center wavelengths: $\lambda_1$, $\lambda_2$, $\lambda_3$) differing from each other, to make photosensitive and heat-sensitive color-developing layers sensitive only to light having different wavelength ranges, in both the case where the photosensitive and heat-sensitive color-developing layer is a positive type and the case where the photosensitive and heat-sensitive color-developing layer is a negative type.

When three different positive type photosensitive and heat-sensitive color-developing layers of the color filter type (A) are laminated, the type in which the latent image forming region of each layer is overlapped on other regions, and each layer contains spectral sensitizing compounds ($C\lambda_1$, $C\lambda_2$, $C\lambda_3$) having absorption wavelengths (center wavelengths: $\lambda_1$, $\lambda_2$, $\lambda_3$) differing from each other, and lights having different center wavelengths $\lambda_1$, $\lambda_2$ and $\lambda_3$ are respectively applied to selective regions, then the irradiated region of each layer is sensitized to initiate the photopolymerization reaction while a remaining region is not photopolymerized and each latent image is formed. Then, the region where the latent image is formed develops a color by heat treatment performed afterwards.

Given as an example of such a structure is a color filter forming material in which two or more photosensitive and heat-sensitive color-developing layers are formed by laminating a cyan color-developing layer, a magenta color-developing layer and a yellow color-developing layer, which are sensitive only to lights having different wavelengths from each other.

An example of a forming material of the color filter type (B), the type in which the latent image forming region of each layer is not overlapped on other regions, is a color filter forming material in which two or more photosensitive and heat-sensitive color-developing layers are formed by laminating a blue color-developing layer, a green color-developing layer and a red color-developing layer which are sensitive only to lights having different wavelengths from each other.

In the case of a positive type color filter forming material for example, the blue color-developing layer can be a layer which is sensitive only to a light having a specific wavelength range (center wavelength: $\lambda_1$), the green color-developing layer can be a layer which is sensitive only to a light having a wavelength range differing from the above wavelength range (center wavelength: $\lambda_2$) and the red color-developing layer can be a layer which is sensitive only to a light having a wavelength range differing from the above two wavelength ranges (center wavelength: $\lambda_3$). When the blue color-developing region is exposed to lights having center wavelengths $\lambda_2$ and $\lambda_3$ respectively by using a digital light source such as laser light, the green color-developing layer and the red color-developing layer in the blue color-developing region are sensitized and photo-polymerized. Similarly, when the green color-developing region is exposed to lights having center wavelengths $\lambda_1$ and $\lambda_3$ respectively, the blue color-developing layer and the red color-developing layer in the green color-developing region are sensitized and photo-polymerized. In this manner, a latent image is formed in each of the blue color-developing layer and the green color-developing layer. Then, when heat is applied to the photosensitive and heat-sensitive color-developing layer in which these latent images are formed, only the regions where the latent image is formed in the blue color-developing layer and in the green color-developing layer develop a color. Also, regions to which light is not applied at all in the blue color-developing layer, the green color-developing layer and the red color-developing layer develop a color to form a black region, which may be used as a black matrix.

A color filter forming material which is of the type of color filter type (A) and uses a negative type photosensitive and heat-sensitive color-developing layer is provided with a negative type photosensitive and heat-sensitive color-developing layer having a yellow color-developing layer, a magenta color-developing layer and a cyan color-developing layer which respectively are sensitive to lights having different wavelengths ($\lambda_1$, $\lambda_2$ or $\lambda_3$). Two types of digital light are used to carry out exposure corresponding to each color-developing region to photo-polymerize two layers in the same manner as in the case of the color filter type (B), whereby the similar color filter can be obtained.

Further, in a color filter forming material which is of the type of color filter type (B) and uses a negative type photosensitive and heat-sensitive color-developing layer, a blue color-developing layer which is sensitive only to a light having a specific wavelength range (center wavelength: $\lambda_1$), a green color-developing layer which is sensitive only to a light having a wavelength range differing from the above wavelength range (center wavelength: $\lambda_2$) and a red color-developing layer which is sensitive only to a light having a wavelength range differing from the above two wavelength ranges (center wavelength: $\lambda 3$) are formed. When the blue color-developing region is exposed to light having center wavelength $\lambda_1$, only the exposed portion (the region where a latent image is formed) of the blue color-developing layer is photo-polymerized. Then, when heated, the region where the latent image is formed develops a blue color.

For exposure, light from a white light source may be also used with a color filter which is produced by other methods (e.g., a photographic method) and which is an exposure filter to carry out batch exposure.

Although no particular limitation is imposed on the order of lamination of the yellow, magenta and cyan photosensitive and heat-sensitive color-developing layers of the color filter (A), it is preferable to laminate, for example, the yellow, the magenta and the cyan in this order from the substrate or the cyan, the magenta and the yellow in this order from the support.

Although no particular limitation is imposed on the order of lamination of the blue, green and red photosensitive and heat-sensitive color-developing layers of the color filter (B), it is preferable to laminate, for example, red, green and blue in that order from the substrate.

2. Other Layers (1) Ultraviolet Cutoff Layer

It is preferable to dispose an ultraviolet cutoff layer on the photosensitive and heat-sensitive layer to improve durability of a developed color pattern image. The ultraviolet cutoff layer may be designed to be a layer prepared by including various known ultraviolet absorbers (organic or inorganic) in the same binder resin that is used in a protective layer, described below. As the layer containing an ultraviolet absorber, for example, one prepared by pulverizing (solid-micro-dispersing) an ultraviolet absorber in a water-soluble resin binder solution, one prepared by emulsion-dispersing an ultraviolet absorber, one prepared by mixing a resin latex dispersion in the above emulsion-dispersion, an ultraviolet-absorbing resin latex prepared by polymerizing an ultraviolet-absorbing monomer, an ultraviolet-absorbing binder solution, or one prepared by further dispersing an ultraviolet absorber in the above solution may be applicable without any particular limitation.

(2) Protective Layer

Also, the color filter forming material of the present invention may be provided with a protective layer according to need. The protective layer is preferably disposed as an outermost layer of the color filter forming material, at an incident side of irradiated light.

The protective layer may be either a monolayer structure or a laminate structure consisting of two or more layers.

Examples of materials to be used for the protective layer include: water-soluble polymer compounds such as gelatin, polyvinyl alcohol, carboxy-modified polyvinyl alcohol, vinyl acetate/acrylamide copolymer, silicon-modified polyvinyl alcohol, starch, denatured starch, methyl cellulose, carboxymethyl cellulose, hydroxymethyl cellulose, gum arabic, casein, styrene/maleic acid copolymer hydrolysate, styrene/maleic acid copolymer half ester hydrolysate, isobutylene/maleic acid anhydride copolymer hydrolysate, polyacrylamide derivative, polyvinylpyrrolidone, sodium polystyrenesulfonate and sodium alginate; and latexes such as styrene/butadiene rubber latex, acrylonitrile/butadiene rubber latex, methyl acrylate/butadiene rubber latex and vinyl acetate emulsion.

Preservation stability can be more improved by crosslinking a water-soluble high molecular compound to be used in the protective layer. In this case, known crosslinking agents may be used. Specific examples of the crosslinking agent include water-soluble initial condensates such as N-methylol urea, N-methylolmelamine and urea-formalin, dialdehyde compounds such as glyoxal and glutaraldehyde, inorganic type crosslinking agents such as boric acid and borax, and polyamidoepichlorohydrin.

In the protective layer, known pigments, metal soaps, waxes, surfactants and the like may be used, and also known UV absorbers and UV absorber precursors may be added.

The amount of the protective layer to be applied is preferably 0.2 to 5 $g/m^2$ and more preferably 0.5 to 3 $g/m^2$.

(3) Intermediate Layer

An intermediate layer may be interposed between each monocolor photosensitive and heat-sensitive color-developing layer. The intermediate layer is constituted primarily of a binder, in which additives such as a hardener and a polymer latex may be contained as required.

3. Support

The same support as those of the color filter can be used in the color filter forming material of the present invention.

4. Formation of Layers of a Color Filter Forming Material (1) Production of a Photosensitive and Heat-Sensitive Color-Developing Layer 1) Preparation of Microcapsules In the color filter of the present invention, the color-developing components of the photosensitive and heat-sensitive layer are encapsulated in microcapsules. As a microcapsulating method, a conventionally known method may be used.

Examples of this method include a method utilizing the coacervation of a hydrophilic wall forming material as described in U.S. Pat. Nos. 2,800,457 and 2,800,458, an interfacial polymerization method as described in U.S. Pat. No. 3,287,154, U.K. Patent No. 990443, and JP-B Nos. 38-19574, 42-446 and 42-771, a method using polymer precipitation as described in U.S. Pat. Nos. 3,418,250 and 3,660,304, a method using an isocyanate polyol wall material as described in U.S. Pat. No. 3,796,669, a method using an isocyanate wall material as described in U.S. Pat. No. 3,914,511, a method using a urea-formaldehyde or urea formaldehyde/resorcinol wall-forming material as described in U.S. Pat. Nos. 4,001,140, 4,087,376 and 4,089,802, a method using a wall forming material such as a melamine/formaldehyde resin or hydroxypropyl cellulose as described in U.S. Pat. No. 4,025,455, an in-situ method using polymerization of a monomer as described in JP-B No. 36-9168 and JP-A No. 51-9079, an electrolytic dispersion cooling method as described in U.K. Patent Nos. 952807 and 965074, and a spray drying method as described in U.S. Pat. No. 3,111,407 and U.K. Patent No. 930422.

The microcapsulating method is not limited to these methods. However, in production of a color filter forming material of the present invention, it is preferable to adopt, particularly, an interfacial polymerization method in which an oil phase prepared by dissolving or dispersing the color-developing component in a hydrophobic organic solvent to be a core of the capsule is mixed with a water phase in which a water-soluble polymer is dissolved and emulsion-dispersed by means of a homogenizer, followed by heating to cause a polymer formation reaction at the interface of an oil droplet, thereby forming a microcapsule wall of polymer material.

Specifically, this method can form capsules having a uniform particle diameter in a short time and it is possible to make a color filter forming material having high raw preservability.

A reactant for forming a polymer is added to the inside of oil droplets and/or the outside of the oil droplets. Specific examples of the polymer material include polyurethane, polyurea, polyamides, polyesters, polycarbonates, urea-formaldehyde resins, melamine resins, polystyrene, styrene/methacrylate copolymers and styrene/acrylate copolymers. Among these compounds, polyurethane, polyurea, polyamides, polyesters and polycarbonates are preferable and polyurethane and polyurea are particularly preferable. These polymer materials may be used in combinations of two or more.

Examples of the water-soluble polymer include gelatin, polyvinylpyrrolidone and polyvinyl alcohol.

For example, if polyurethane is to be used as the capsule wall material, polyvalent isocyanate and a second material (e.g., polyol or polyamine) which reacts with the isocyanate to form the capsule wall are mixed in an aqueous solution of a water-soluble polymer (water phase) or an oily medium (oil phase) that is to be encapsulated. This is emulsion-dispersed, followed by heating to cause the polymer forming reaction, whereby the microcapsule walls can be formed.

As the polyvalent isocyanate and the counterpart polyol or polyamine, those described in U.S. Pat. Nos. 3,281,383, 3,773,695 and 3,793,268, JP-B Nos. 48-40347 and 49-24159, and JP-A Nos. 48-80191 and 48-84086 may be used.

In the present invention, the color-developing component to be encapsulated when preparing the microcapsules containing the color-developing component may be present either in a solution state or in a solid state in the capsules.

As the solvent, the same solvents that are used in the case of emulsion-dispersing the aforementioned photopolymerizable composition may be used.

If the color-developing component is encapsulated in the capsule in a solution state, they may be encapsulated in the condition that they are dissolved in the solvent. In this case, the solvent is preferably used in an amount ranging from 1 to 500 parts by weight based on 100 parts by weight of the color-developing component.

Also, in cases where solubility in the solvent of the color-developing component to be encapsulated is low, a high solubility low-boiling point solvent may also be used subsidiarily. Examples of this low-boiling point solvent include ethyl acetate, propyl acetate, isopropyl acetate, butyl acetate and methylene chloride.

An aqueous solution in which a water-soluble polymer is dissolved is used for the water phase. The oil phase is poured into this water phase and thereafter emulsion-dispersed by means of a homogenizer. The water-soluble polymer acts as a protective colloid of a dispersion medium, which makes dispersion uniform and easy, and stabilizes the emulsion-dispersed aqueous solution. Here, in order to emulsion-disperse more uniformly and more stably, a surfactant may be added to one or both of the oil phase and the water phase. As the surfactant, a well-known emulsion surfactant may be used. When the surfactant is added, the amount of the surfactant to be added is preferably 0.1% to 5% and particularly preferably 0.5% to 2% based on the weight of the oil phase.

Also, as the surfactant to be contained in the water phase, an appropriate surfactant that does not react with the protective colloid to cause precipitation or coagulation can be suitably selected from anionic and nonionic surfactants.

Preferable examples of the surfactant may include sodium alkylbenzenesulfonate, sodium alkylsulfate, sodium dioctyl sulfosuccinate and polyalkylene glycol (e.g., polyoxyethylene nonylphenyl ether).

As mentioned above, the water-soluble polymer to be contained as the protective colloid in the water phase into which the oil phase is to be mixed may be selected from known anionic polymers, nonionic polymers and amphoteric polymers.

As the anionic polymer, any of natural and synthetic polymers may be used and those having a —COO— group or a —SO$_2$— group are exemplified.

Specific examples of anionic polymers include natural products such as gum arabic, alginic acid and pectin; semi-synthetic products such as carboxymethyl cellulose and gelatin derivatives, e.g., phthallized gelatin, sulfated starch, sulfated cellulose and lignosulfonic acid; and synthetic products such as copolymers (including hydrolysates) of maleic acid anhydride, polymers and copolymers of acrylic acid and/or methacrylic acid, polymers and copolymers of vinylbenzenesulfonic acid type, and carboxy-modified polyvinyl alcohol.

Examples of nonionic polymers include polyvinyl alcohol, hydroxyethyl cellulose and methyl cellulose.

Examples of amphoteric polymers include gelatins. Among these polymers, gelatins, gelatin derivatives and polyvinyl alcohol are preferable.

The water-soluble polymer is used as an aqueous 0.01 to 10 weight % solution.

The emulsification of the oil phase containing the aforementioned components and the water phase containing the protective colloid and the surfactant is easily conducted using techniques used for usual emulsification of microparticles, for example, high speed stirring and ultrasonic dispersion. These include known emulsifiers such as a homogenizer, Manton-Gaulin, ultrasonic dispersing machine, dissolver and KADY mill.

After the emulsification, the emulsion is heated to 30 to 70° C. to promote the capsule wall-forming reaction. Also, in order to prevent coagulation among capsules during the reaction, it is necessary to add water to decrease the probability of collision between capsules and it is also necessary to stir sufficiently.

Also, a dispersant for preventing coagulation may be further added during the reaction. With the progress of this polymerization reaction, generation of carbon dioxide gas will be observed. Termination of generation of the gas is regarded as a rough indication of termination of the capsule wall-forming reaction. In general, microcapsules including a target dye can be obtained by continuing the reaction for several hours.

The average particle diameter of the microcapsules to be used in the color filter forming material of the present invention is preferably 20 $\mu$m or less and more preferably 5 $\mu$m or less, in view of obtaining high resolution. If the diameter of the formed microcapsules is excessively small, the surface area thereof for a fixed solid content will be large, requiring a large amount of wall material, and therefore the average particle diameter is preferably 0.1 $\mu$m or more.

2) Preparation of Components Disposed Outside of the Microcapsule

In the photosensitive and heat-sensitive color-developing layer of the color filter of the present invention, the components present outside of the microcapsule, namely, the compound having a site which reacts with the color-developing component to develop a color and a polymerizable group in the same molecule or the substantially colorless compound which reacts with the color-developing component to develop a color and the substantially colorless compound having a polymerizable group and a site which suppresses the reaction between the color-developing component and the colorless compound, the spectral sensitizing dye, and the organic borate compound, including the other components, may be used by solid-dispersing these components separately or simultaneously using a dispersant such as a water-soluble polymer in a sand mill. It is, however, more preferable that these compounds be used as an emulsion dispersion which is emulsified in the following manner: after these components have been dissolved in advance in a high-boiling point organic solvent which is slightly soluble in water or insoluble in water, this solution is mixed with an aqueous polymer solution (water phase) containing a surfactant and/or a water-soluble polymer as a protective colloid and emulsified using an emulsifying method as explained in the description of production of the microcapsules. In this case, a low-boiling point solvent may be used as a dissolving adjuvant according to need.

The diameter of the emulsion-dispersed particle is preferably 1 $\mu$m or less.

3) Formation of the Photosensitive and Heat-Sensitive Color-Developing Layer

The photosensitive and heat-sensitive color-developing layer is formed by coating the support with a coating solution for the photosensitive and heat-sensitive color-developing layer, the coating solution being prepared by mixing the microcapsule solution with the dispersion or emulsion dispersion containing the components to be disposed outside of the capsules.

Examples of solvents usable for the preparation of the coating solution include water; alcohols such as methanol, ethanol, n-propanol, isopropanol, n-butanol, sec-butanol, methyl cellosolve and 1-methoxy-2-propanol; solvents containing a halogen atom such as methylene chloride and ethylene chloride; ketones such as acetone, cyclohexanone and methyl ethyl ketone; esters such as methyl cellosolve acetate, ethyl acetate and methyl acetate; toluene; and xylene, which may be used either singly or as mixtures of two or more. Among these solvents, water is particularly preferable.

As the apparatus used for applying the coating solution, a blade coater, rod coater, knife coater, roll doctor coater, reverse roll coater, transfer roll coater, gravure coater, kiss roll coater, curtain coater, extrusion coater or the like may be used.

As a coating method, coating may be performed with reference to "Research Disclosure, Vol. 200" (December, 1980, Item 20036 Paragraph XV).

The layer thickness of the photosensitive and heat-sensitive color-developing layer is preferably in a range from 0.1 to 50 $\mu$m and more preferably in a range from 5 to 35 $\mu$m.

(2) Other Layers

The ultraviolet cutoff layer, the protective layer, the intermediate layer and the like are formed by applying coating solutions prepared by dispersing or emulsion-dispersing components for forming these layers in the same manner as for the photosensitive and heat-sensitive color-developing layer, followed by drying the coating solutions.

III Production of a Color Filter

In the process for producing a color filter according to the present invention, it is only necessary to use a color filter-forming material produced by laminating plural photosensitive and heat-sensitive color-developing layers on a support and to perform a series of steps such as exposure, heating and fixing. Thus, productivity is improved and the production cost of the color filter is greatly reduced. Also, all the steps are performed in a completely dry condition, decreasing environmental load.

1. Exposure Treatment (Formation of a Latent Image)

The color filter forming material produced in the above manner is subjected to predetermined pattern exposure corresponding to the developed color pattern of each layer. The exposure may be carried out either for each layer in turn or all together.

(a) Light from a white light source may be applied to the entire surface of the color filter forming material successively through each of bandpass filters corresponding to the maximum absorption wavelength ranges of the spectral sensitivities of the respective layers. This exposure method may be used for the positive type of color filter (A), and for the negative type of color filter (B).

As the white light source, for example, a high pressure mercury lamp, Xe light source, halogen light source or tungsten light source may be used.

(b) A predetermined pattern may be formed on the color filter forming material by direct exposure using digital light sources corresponding to the maximum absorption wavelengths of spectral sensitivity of the respective layers. This exposure method may be used regardless of the type of color filter.

As the digital light source, a light emitting element or a combination of an arbitrary light source and a light modulation element may be used. Examples of the light emitting element may include lasers, LED arrays and organic EL element arrays. As the light source, those described in the case of (A) may be used. Further, as examples of the light modulation element, liquid crystal shutters, micro-lens arrays and micro-mirror arrays are given.

For example, if the maximum absorption light-sensitive wavelength of the yellow color-developing layer is 405 nm, the maximum absorption light-sensitive wavelength of the magenta color-developing layer is 532 nm and the maximum absorption light-sensitive wavelength of cyan color-developing layer is 660 nm in a case where a positive type photosensitive and heat-sensitive color-developing layer in the color filter type (A) is exposed to laser light, a 405 nm laser diode (LD) may be used to develop a blue color (subtractive color mixture), a 532 nm LD exciting a YLF solid/SHG laser may be used to develop a green color and a 660 nm LD may be used to develop a red color.

(c) Light from a white light source may be applied once to the whole surface (one shot method) through a color filter having a predetermined color pattern. As the light source, those described in (a) above may be used. This exposure method may be used for the positive type of color filter (A), and for the negative type of color filter (B).

For example, in the case of producing a red, green, blue and black (black matrix) color filter by using a positive type color filter type (A) forming material according to the method (c), just one application of light through a red, green, blue and black color filter makes it possible to reproduce a color filter (including a black matrix) having the same color pattern as the color filter used for exposure, showing that this method is a very simple method.

2. Heat Treatment (Developing)

The color filter forming material on which the latent image has been formed is heated to develop the specified color pattern. As a heating method, hot air zone heating, heat roller heating, infrared heating or the like is used. Generally, the heating temperature is preferably 80 to 200° C. and more preferably 85 to 130° C., though it depends on the composition of the photosensitive and heat-sensitive color-developing layer. A heating time is preferably in a range from 3 seconds to 1 minute and more preferably in a range from 5 seconds to 30 seconds.

3. Fixing Treatment

This treatment is carried out for fixing the developed color pattern by irradiating the surface of the photosensitive and heat-sensitive color-developing layer with light from a white light source. This treatment has the purpose not only of fixing the developed color pattern but also of color extinction, decomposition and deactivation of, for example, any spectral sensitizing dye compound and diazonium salt compound remaining in the photosensitive and heat-sensitive color-developing layer. Applying light such that luminescence on the film surface is 38000 lux and an irradiation time is about 30 seconds is preferable.

By the above treatment, all the surface of the photosensitive and heat-sensitive recording material is photopolymerized and cured, and fixation of the formed image and extinction of finally unneeded coloring components (e.g., the spectral sensitizing dye) can be achieved at the same time, whereby a very stable and high color-purity image can be obtained.

In the process for producing a color filter according to the present invention, it is only required to carry out steps such as exposure, heating and fixing for the color filter forming material as described above. Therefore, productivity is improved and the production cost of the color filter can be significantly decreased. Also, all the steps are carried out in a completely dry condition and therefore environmental load is decreased.

EXAMPLES

The present invention will be explained in more detail by way of Examples, which are not intended to be limiting of the present invention.

Example 1

In this Example, an example of the aforementioned color filter type (A) will be explained.

(Preparation of a Coating Solution for a Yellow Color-Developing Layer)

<Preparation of a Microcapsule Solution of an Electron-Donating Colorless Dye (for Developing a Yellow Color)>

8.9 g of the following electron-donating colorless dye (1), which develops a yellow color, was dissolved in 16.9 g of ethyl acetate, to which were then added 20 g of a capsule wall material (Trademark: Takenate D-1 10N, manufactured by Takeda Chemical Industries, Ltd.) and 2 g of a capsule wall material (Trademark: Millionate MR200, manufactured by Nippon Polyurethane Industry Co., Ltd.).

The resulting solution was added to a mixture solution of 42 g of 8% phthallized gelatin and 1.4 g of a sodium dodecylbenzenesulfonate solution, and emulsion-dispersed at 20° C. to obtain an emulsion. Then, 14 g of water and 72 g of an aqueous 2.9% tetraethylenepentamine solution were added to the resulting emulsion and the emulsion was heated to 60° C. with stirring to obtain microcapsules containing the electron-donating colorless dye (1) in their cores and having an average particle diameter of 0.5 μm after 2 hours had passed.

Electron-Donating Colorless Dye (1)

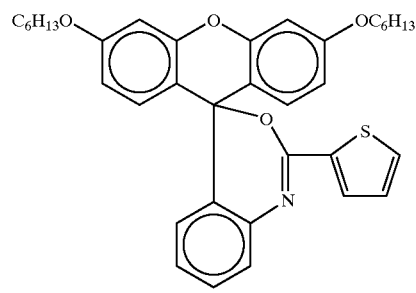

<Preparation of an Emulsion of Components to be Disposed Outside Capsules>

5 g of a mixture of the following electron-donating compounds (1) and (2) having polymerizable groups and 0.017 g of the following thermal polymerization inhibitor (ALI) was dissolved in 5.5 g of isopropyl acetate (solubility in water: about 4.3%) at 42° C. 0.042 g of the aforementioned spectral sensitizing dye (3-15), 0.25 g of the aforementioned organic borate compound (29) and 0.042 g of the following adjuvant (1) compounded for the purpose of attaining high sensitization were added to this mixture solution and dissolved at 42° C.

The resulting solution was added to a mixture solution of 13 g of an aqueous 8% gelatin solution and 0.8 g of an aqueous 10% solution of surfactant (1) (shown below) and emulsified using a homogenizer (manufactured by Nippon Seiki) at 10000 rpm for 5 minutes to obtain an emulsion of the components to be disposed outside the capsules.

Polymerizable Electron-Accepting Compound

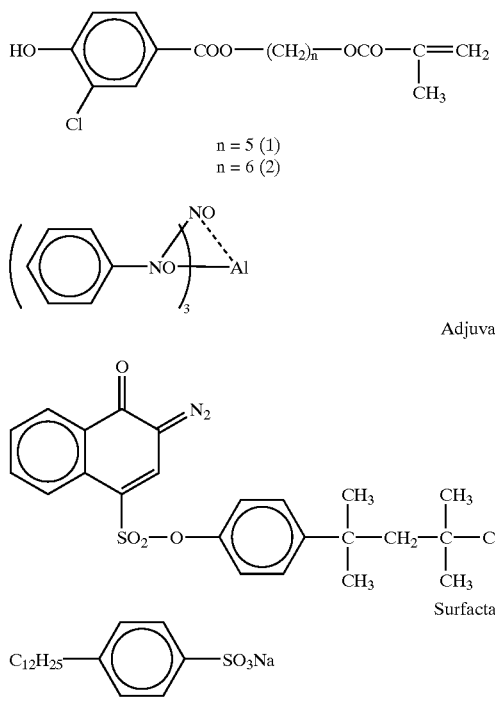

n = 5 (1)
n = 6 (2)

Adjuvant (1)

Surfactant (1)

<Preparation of a Coating Solution for a (Yellow) Photosensitive and Heat-Sensitive Color-Developing Layer>

4 g of the solution of the microcapsules in which the electron donating colorless dye was encapsulated, 8 g of the emulsion of components to be disposed outside the capsules and 2 g of an aqueous 4% gelatin solution were mixed to prepare a coating solution for a yellow color-developing photosensitive and heat-sensitive recording layer.

(Preparation of a Coating Solution for a Magenta Color-Developing Layer)

<Preparation of Microcapsules of an Electron-Donating Colorless Dye (for Developing a Magenta Color)>

A solution of microcapsules having the following electron-donating colorless dye (2) in their cores and having an average particle diameter of 0.5 μm was obtained in the same manner as in the preparation of the solution of microcapsules for the yellow color-developing layer, except that the following electron-donating colorless dye (2) for developing a magenta color was used in place of the electron-donating colorless dye (1) used for the yellow color-developing layer.

Electron-Donating Colorless Dye (2)

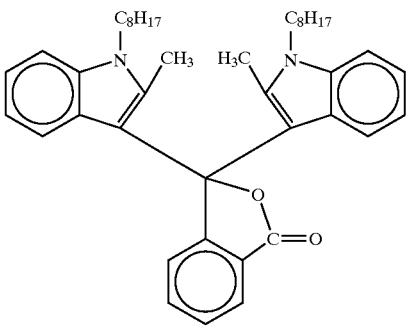

<Preparation of an Emulsion of Components to be Disposed Outside the Capsules>

An emulsion of the components to be disposed outside the capsules was obtained in the same manner as in the preparation of the yellow color-developing layer except that the aforementioned organic cationic dye (1-16) was used in place of the spectral sensitizing dye (3-15) used for the yellow color-developing layer.

<Preparation of a Coating Solution for a (Magenta) Photosensitive and Heat-Sensitive Color-Developing Layer>

2 g of the solution of the microcapsules in which the electron-donating colorless dye was encapsulated, 8 g of the emulsion of components to be disposed outside the capsules, and 1.5 g of an aqueous 4% gelatin solution were mixed to prepare a coating solution for a magenta color-developing photosensitive and heat-sensitive color-developing layer.

(Preparation of a Coating Solution for a Cyan Color-Developing Layer)

<Preparation of a Solution of Microcapsules of an Electron-Donating Colorless Dye (for Developing a Cyan Color)>

A solution of microcapsules containing the following electron-donating colorless dye (3) in their cores and having an average particle diameter of 0.5 μm was obtained in the same manner as in the preparation of the solution of microcapsules for the yellow color-developing layer, except that the following electron-donating colorless dye (3) for developing a cyan color was used in place of the electron-donating colorless dye (1) used for the yellow color-developing layer.

Electron-Donating Colorless Dye (3)

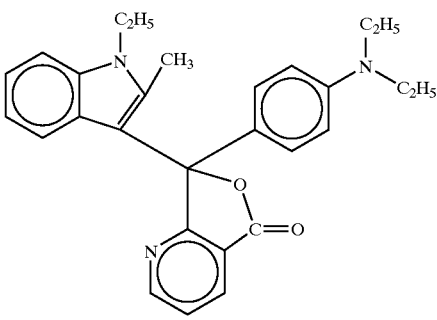

<Preparation of an Emulsion of Components to be Disposed Outside the Capsules>

An emulsion of components to be disposed outside the capsules was obtained in the same manner as in the preparation of the yellow color-developing layer except that 0.042 g of the aforementioned organic cationic dye (1-12) was used in place of the spectral sensitizing dye (3-15) used for the yellow color-developing layer.

<Preparation of a Coating Solution for a (Cyan) Photosensitive and Heat-Sensitive Color-Developing Layer>

4 g of the solution of the microcapsules in which the electron-donating colorless dye was encapsulated, 8 g of the emulsion of components to be disposed outside the capsules, and 1.5 g of an aqueous 4% gelatin solution were mixed to prepare a coating solution for a cyan color-developing photosensitive and heat-sensitive color-developing layer.

(Coating Solution for an Intermediate Layer)

12 g of synthetic mica (trade name: Suzulite 40H, manufactured by MRI) was added to 188 g of water, to which 2 g of sodium dodecylsulfate had been added, and dispersed using a homogenizer at 10000 rpm for 30 minutes. 200 g of an aqueous 5.6% gelatin solution was further added to the resulting dispersion to produce a dispersion of swelling synthetic mica.

8.5 g of an aqueous 16% gelatin solution, 12.6 g of distilled water, 5.5 g of the dispersion of swelling synthetic mica and 1.6 g of an aqueous solution containing 2% of the following surfactant (2) were mixed to prepare a coating solution (1) for an intermediate layer.

Surfactant (2)

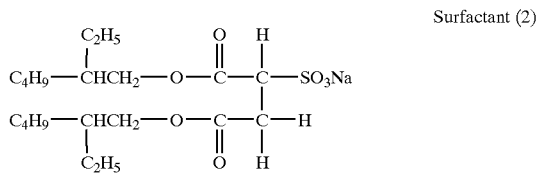

(Coating Solution for a Protective Layer)

8.8 g of an aqueous 18% gelatin solution, 7.0 g of distilled water, 0.4 g of an aqueous solution containing 2% of the surfactant (2), 1.2 g of an aqueous solution containing 2% of the following surfactant (3), 8.8 g of an aqueous 2% vinylsulfone solution (film hardener) and 1.8 g of 20% JULIMER AC10LA (polyacrylic acid; manufactured by Nippon Junyaku Kabushiki Kaisha) were mixed to prepare a coating solution (1) for a protective layer.

Surfactant (3)

(Production of a Color Filter-Forming Material)

The coating solution for a yellow color-developing photosensitive and heat-sensitive color-developing layer was applied to a TAC transparent support having a thickness of 75 μm by using a coating bar such that the dry weight of the whole coating layer was 4.5 g/m². The coating solution for an intermediate layer was then applied to the above layer by using a coating bar such that dry weight thereof was 1.0 g/m², and the layers were dried.

Further, the coating solution for a magenta color-developing photosensitive and heat-sensitive color-developing layer was applied to the intermediate layer by using a coating bar such that dry weight of the coating layer was 6 g/m², followed by drying. This layer was coated with the coating solution for an intermediate layer such that dry weight thereof was 1.0 g/m² and the obtained layer was dried.

Further, the intermediate layer was coated with the coating solution for a cyan color-developing photosensitive and heat-sensitive color-developing layer by using a coating bar such that dry weight of the coating layer was 3.5 g/m² and the resultant layer was dried. Then, the cyan color-developing photosensitive and heat-sensitive color-developing layer was coated with the coating solution for a protective layer such that the dry weight of the coating layer was 2.0 g/m², and the layer was dried to obtain a color filter-forming material.

(Production of a Color Filter)

The entire surface of the color filter-forming material was uniformly irradiated (intensity at the film surface=0.02 mW/cm²) with xenon light (1 kW), which was a white light source, from the protective layer side for 5 seconds, from a position at a distance of 50 cm from the color filter material through a striped color filter produced by a photoresist method. Thereafter, the photosensitive and heat-sensitive color-developing layer was heated to 110° C. for 10 seconds by using a heat roller. Thus, the same color pattern as that of the striped color filter was obtained. In succession, light from a white fluorescent lamp was applied to the whole surface (intensity at the film surface: 38000 lux, 30 seconds) to fix the color pattern.

As a result, a color filter having the same color pattern as the striped color filter was obtained (the width of each stripe of red, blue and green was 50 m and the line width of a black matrix was 10 μm).

Example 2

In this Example, an example of the color filter type (B) will be explained.

(Coating Solution for a Blue Color-Developing Photosensitive and Heat-Sensitive Color-Developing Layer)

2 g of the microcapsule solution of the electron-donating colorless dye for developing a cyan color used in Example 1, 2 g of the microcapsule solution of the electron-donating colorless dye for developing a magenta color used in Example 1, 8 g of the emulsion to be disposed outside the microcapsules for a yellow color-developing layer which was used in Example 1, and 1.5 g of an aqueous 4% gelatin solution were mixed to prepare a coating solution for a blue color-developing photosensitive and heat-sensitive recording layer.

(Coating Solution for a Green Color-Developing Photosensitive and Heat-Sensitive Color-Developing Layer)

2 g of the microcapsule solution of the electron-donating colorless dye for developing a cyan color used in Example 1, 2 g of the microcapsule solution of the electron-donating colorless dye for developing a yellow color used in Example 1, 8 g of the emulsion of components to be disposed outside the microcapsules for a magenta color-developing layer which was used in Example 1, and 1.5 g of an aqueous 4% gelatin solution were mixed to prepare a coating solution for a green color-developing photosensitive and heat-sensitive color-developing layer.

(Coating Solution for a Red Color-Developing Photosensitive and Heat-Sensitive Color-Developing Layer)

2 g of the microcapsule solution of the electron-donating colorless dye for developing a magenta color used in Example 1, 2 g of the microcapsule solution of the electron-donating colorless dye for developing a yellow color used in Example 1, 8 g of the emulsion to be disposed outside the microcapsules for a cyan color-developing layer which was used in Example 1, and 1.5 g of an aqueous 4% gelatin solution were mixed to prepare a coating solution for a red color-developing photosensitive and heat-sensitive color-developing layer.

A red color-developing layer, a green color-developing layer and a blue color-developing layer were formed in this order from a support in the same manner as in Example 1 except that the coating solutions for blue, green and red photosensitive and heat-sensitive color-developing layers were used for coating, such that dry weight of each of the coating layers was 8 g/m², to form a color filter forming material. The resulting color filter forming material was subjected to exposure, heating and fixing, thus producing a color filter.

In the exposure treatment, the blue color-developing region was irradiated with 532 nm laser light and 660 nm laser light, the green color-developing region was irradiated with 405 nm laser light and 660 nm laser light and the red color-developing region was irradiated with 405 nm laser light and 532 nm laser light.

A color filter corresponding to a predetermined exposure pattern was thus obtained.

What is claimed is:

1. A color filter comprising a light-transmissive support and at least two color-developing layers that develop hues different from each other, wherein said color-developing layers comprise a photosensitive and heat-sensitive color-developing layer, the color-developing layers having been laminated on the support and each color-developing layer having been developed in a predetermined color pattern, and respective developed color patterns of the layers including pixels at which the color patterns overlap in a direction of lamination, which pixels have a hue expressed by subtractive color mixing of the colors of the layers that are developed at the region.

2. A color filter according to claim 1, wherein said color-developing layers comprise three layers which are a cyan color-developing layer, a magenta color-developing layer and a yellow color-developing layer.

3. A color filter according to claim 1, comprising a black matrix formed by subtractive color mixing of developed colors of a region at which the color patterns of three layers, including a cyan color-developing layer, a magenta color-developing layer and a yellow color-developing layer, overlap each other.

4. A color filter according to claim 1, further comprising an ultraviolet cutoff layer on an uppermost layer of the color-developing layers.

5. A color filter comprising a light-transmissive support and at least two color-developing layers that develop hues different from each other, wherein said color-developing layers comprise a photosensitive and heat-sensitive color-developing layer, the color-developing layers having been laminated on the support and each color-developing layer having been developed in predetermined color pattern, and respective developed color patterns of the layers including pixels at which the color patterns substantially do not overlap in a direction of lamination.

6. A color filter according to claim 5, wherein said color-developing layers comprise three layers which are a blue color-developing layer, a green color-developing layer and a red color-developing layer.

7. A color filter according to claim 6, wherein the blue color-developing layer comprises a cyan color-developing component and a magenta color-developing component, the green color-developing layer comprises a cyan color-developing component and a yellow color-developing component and the red color-developing layer comprises a yellow color-developing component and a magenta color-developing component.

8. A color filter according to claim 5, comprising a black matrix formed by subtractive color mixing of developed colors of a region at which the color patterns of three layers, including a blue color-developing layer, a green color-developing layer and a red color-developing layer, overlap each other.

9. A color filter according to claim 5, further comprising an ultraviolet cutoff layer on an uppermost layer of the color-developing layers.

10. A color filter forming material comprising a light-transmissive support and at least two photosensitive and heat-sensitive color-developing layers capable of developing hues different from each other, the color-developing layers being laminated on the support.

11. A color filter forming material according to claim 10, wherein the at least two photosensitive and heat-sensitive color-developing layers comprise a cyan color-developing layer, a magenta color-developing layer and a yellow color-developing layer, which are laminated and are respectively sensitive to lights of mutually different wavelength ranges.

12. A color filter forming material according to claim 10, wherein the at least two photosensitive and heat-sensitive color-developing layers comprise a blue color-developing layer, a green color-developing layer and a red color-developing layer, which are laminated and are respectively sensitive to lights of mutually different wavelength ranges.

13. A color filter forming material according to claim 10, wherein the at least two photosensitive and heat-sensitive color-developing layers each comprises heat-sensitive microcapsules in which a color-developing component is encapsulated and, outside the microcapsules, at least a compound that has in the same molecule a site capable of reacting with the color-developing component to develop color and a polymerizable group, a spectral sensitizing dye, and an organic borate compound.

14. A color filter forming material according to claim 10, wherein the at least two photosensitive and heat-sensitive color-developing layers each comprises heat-sensitive microcapsules in which a color-developing component is encapsulated and, outside the microcapsules, at least a first substantially colorless compound capable of reacting with the color-developing component to develop color, a second substantially colorless compound having in the same molecule a polymerizable group and a site capable of suppressing reaction between the color-developing component and the first colorless compound, a spectral sensitizing dye, and an organic borate compound.

15. A color filter forming material according to claim 10, wherein each color-developing layer comprises at least one spectral sensitizing dye selected from the group consisting of cationic dyes, anionic dyes and nonionic dyes.

16. A color filter forming material according to claim 10, wherein each color-developing layer comprises a borate compound, and the borate compound comprises a compound represented by the following formula (1):

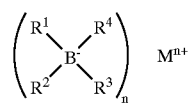

Formula (1)

wherein M represents a cation selected from an alkali metal atom, quaternary ammonium, pyridinium, quinolinium, diazonium, morpholinium, tetrazolium, acridinium, phosphonium, sulfonium, oxosulfonium, sulfur, oxygen, carbon, halogenium, Cu, Ag, Hg, Pd, Fe, Co, Sn, Mo, Cr, Ni, As and Se; n denotes an integer from 1 to 6; $R^1$, $R^2$, $R^3$ and $R^4$ each represents a halogen atom, a substituted or unsubstituted alkyl group, a substituted or unsubstituted alkenyl group, a substituted or unsubstituted alkinyl group, an alicyclic group, a substituted or unsubstituted aryl group, a substituted or unsubstituted alkaryl group, a substituted or unsubstituted aryloxyl group, a substituted or unsubstituted aralkyl group, a substituted or unsubstituted heterocyclic group, or a substituted or unsubstituted silyl group; and $R^1$, $R^2$, $R^3$ and $R^4$ may be the same as or different from each other and two or more groups thereof may be joined to form a cyclic structure.

17. A color filter forming material according to claim 10, further comprising an ultraviolet cutoff layer on the photosensitive and heat-sensitive color-developing layers.

18. A process for producing a color filter from a color filter forming material that includes at least two photosensitive and heat-sensitive color-developing layers, which are capable of developing hues different from each other, laminated on a light-trasmissive support, the process comprising the steps of:

forming latent images by exposing each of the photosensitive and heat-sensitive color-developing layers, such that portions of at least two latent image-formed regions, which portions correspond to pixels, overlap each other in a direction of lamination;

developing color by heating the photosensitive and heat-sensitive color-developing layers; and fixing color-developed patterns formed by the step of developing color.

19. A process for producing a color filter according to claim 18, wherein said step of forming latent images comprises irradiating light to an entire surface of the color filter forming material from a white light source through a color filter that has a predetermined color pattern.

20. A process for producing a color filter according to claim 18, wherein said step of forming latent images comprises irradiating light from a white light source sequentially through bandpass filters each corresponding to a sensitive wavelength range of one of the at least two photosensitive and heat-sensitive color-developing layers.

21. A process for producing a color filter from a color filter forming material that includes at least two photosensitive and heat-sensitive color-developing layers, which are capable of developing hues different from each other, laminated on a light-transmissive support, the process comprising the steps of:

forming latent images by exposing each of the photosensitive and heat-sensitive color-developing layers, such that portions of latent image formed regions of the respective layers, which portions correspond to pixels, substantially do not overlap each other in a direction of lamination;

developing color by heating the photosensitive and heat-sensitive color-developing layers; and fixing color-developed patterns formed by the step of developing color.

22. A process for producing a color filter according to claim 21, wherein said step of forming latent images comprises, for each of the at least two photosensitive and heat-sensitive color-developing layers, forming a predetermined pattern by direct exposure using a digital light source which includes one of a light emitting element and a combination of a light source and a light modulation element, and which corresponds to a sensitive wavelength range of the each of the layers.

23. A process for producing a color filter according to claim 22, wherein the light emitting element comprises one of a laser, an LED array and an organic EL element array.

24. A process for producing a color filter according to claim 22, wherein the light modulation element comprises one of a liquid crystal shutter, a micro-lens array and a micro-mirror array.

25. A process for producing a color filter according to claim 21, wherein said step of forming latent images comprises, for each of the at least two photosensitive and heat-sensitive color-developing layers, forming a predetermined pattern by direct exposure using a digital light source which includes one of a light emitting element and a combination of a light source and a light modulation element, and which corresponds to a sensitive wavelength range of the each of the layers.

26. A process for producing a color filter according to claim 25, wherein the light emitting element comprises one of a laser, and LED array and an organic EL element array.

27. A process for producing a color filter according to claim 25, wherein the light modulation element comprises one of a liquid crystal shutter, a micro-lens array and a micro-mirror array.

* * * * *